US008263195B2

United States Patent
Furukawa et al.

(10) Patent No.: US 8,263,195 B2
(45) Date of Patent: *Sep. 11, 2012

(54) CELLULOSE ESTER FILM, OPTICALLY COMPENSATORY FILM, POLARIZING PLATE, AND LIQUID CRYSTAL DISPLAY DEVICE

(75) Inventors: Hiromichi Furukawa, Minami-Ashigara (JP); Mamoru Sakurazawa, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 12/793,710

(22) Filed: Jun. 4, 2010

(65) Prior Publication Data

US 2010/0308264 A1 Dec. 9, 2010

(30) Foreign Application Priority Data

Jun. 5, 2009 (JP) .................. 2009-136726
Oct. 20, 2009 (JP) .................. 2009-241468
Dec. 10, 2009 (JP) .................. 2009-280705

(51) Int. Cl.
*G02B 5/30* (2006.01)
*G02F 1/13363* (2006.01)
*C08B 3/16* (2006.01)

(52) U.S. Cl. ........... 428/1.31; 536/64; 536/65; 349/117; 526/238.21

(58) Field of Classification Search .................. 252/582, 252/585, 299.62, 299.66, 299.67; 428/1.31, 428/220; 359/485.01; 536/64, 65; 349/96, 349/117; 526/238.21

See application file for complete search history.

(56) References Cited

U.S. PATENT DOCUMENTS

| 2009/0169775 A1 | 7/2009 | Mukinoki et al. | |
| 2009/0286016 A1* | 11/2009 | Sakurazawa et al. | 428/1.31 |
| 2010/0192803 A1 | 8/2010 | Matsufiji et al. | |
| 2011/0001904 A1* | 1/2011 | Tachikawa et al. | 349/96 |
| 2011/0001907 A1* | 1/2011 | Sakurazawa et al. | 349/96 |

FOREIGN PATENT DOCUMENTS

| JP | 61-276836 A | 12/1986 |
| JP | 2006-064803 A | 3/2006 |
| JP | 2007-003767 A | 1/2007 |
| JP | 2009-098674 A | 5/2009 |
| JP | 2009-155455 A | 7/2009 |
| JP | 2009-235377 A | 10/2009 |
| JP | 2009-299014 | 12/2009 |
| WO | WO 2005/061595 A1 | 7/2005 |

OTHER PUBLICATIONS

Plastic Zairyo Koza (Lecture on Plastic Material), vol. 17, Nikkan Kogyo Shinbun Sha, "Seniso-Kei Jushi (Fiber-Based Resin)", 1970, excerption, pp. 118-147.

* cited by examiner

*Primary Examiner* — Shean Wu
(74) *Attorney, Agent, or Firm* — Buchanan Ingersoll & Rooney PC

(57) ABSTRACT

A cellulose ester film is provided and includes a polycondensate obtained from a diol and a dicarboxylic acid, and the polycondensate contains the following (1) and (2).

(1) A dicarboxylic acid residue containing an aromatic dicarboxylic acid residue and an aliphatic dicarboxylic acid residue having an average carbon number of 4.0 to 5.0, in which a ratio of the aromatic dicarboxylic acid residue represented by the following equation is from 40% by mole to 95% by mole:

The ratio of the aromatic dicarboxylic acid residue= [(the number of moles of the aromatic dicarboxylic acid residue)/((the number of moles of the aromatic dicarboxylic acid residue)+(the number of moles of the aliphatic dicarboxylic acid residues))]×100.

(2) An aliphatic diol residue having an average carbon number of 2.0 to 3.0.

10 Claims, No Drawings

CELLULOSE ESTER FILM, OPTICALLY COMPENSATORY FILM, POLARIZING PLATE, AND LIQUID CRYSTAL DISPLAY DEVICE

This application is based on and claims priority under 35 U.S.C. §119 from Japanese Patent Application Nos. 2009-136726, 2009-241468, and 2009-280705, filed Jun. 5, Oct. 20, and Dec. 10, 2009, respectively, the entire disclosures of which are herein incorporated by reference.

BACKGROUND OF THE INVENTION

1. Field of the Invention

The present invention relates to a cellulose ester film, an optically compensatory film, a polarizing plate, and a liquid crystal display device.

2. Description of Related Art

In liquid crystal display devices, the use of a transparent polymer film as an optically compensatory film for the purposes of enlarging a viewing angle, improving image coloration, and enhancing contrast is a widely known technology. In a most diffused VA (vertically aligned) mode, TN mode, or the like, optically compensatory films capable of controlling particularly optical characteristics (for example, an Re value and an Rth value) to desired values is being demanded.

On the other hand, a cellulose ester film is widely employed in optically compensatory films, the polarizing plates, and the image display devices since films which are more excellent from the standpoints of planarity and uniformity and which have a suitable water vapor permeability can be prepared from the cellulose ester film. Further, a cellulose ester film can be adhered directly on-line with the most general a polarizer including polyvinyl alcohol (PVA)/iodine. For that reason, the cellulose ester, in particular, cellulose acetate, is widely employed as a protective film of a polarizing plate.

On the other hand, a solution film-forming process is widely utilized as a method for preparing a cellulose ester film to be used for optical applications. In this case, for the purpose of imparting high-speed film-forming adaptability during the preparation, it is preferred to add a plasticizer. This is because by adding a plasticizer, it is possible to volatilize the solvent within a short period of time during drying at the time of solution film-forming.

However, in a transparent polymer film containing a plasticizer which is usually used, there is, for example, the case where, when the polymer film is treated at a high temperature in a drying step or the like, smoking is generated; failures in operations are caused due to the attachment of a volatilized oil or the like to a manufacturing machine; or area defects are generated due to the attachment of stains to the polymer film. For this reason, there were naturally restrictions on the preparation condition or treatment condition relative to the transparent polymer film using a plasticizer.

Moreover, in the case where a transparent polymer film such as a cellulose ester film and the like is used for optical applications such as an optically compensatory film, a support of an optically compensatory film, a protective film of a polarizing plate, and a liquid crystal display device, it is a very important factor to control the optical anisotropy in determining the performance of a display device (for example, visibility). For that reason, development of a film which has high development of optical characteristics, hardly suffers from contamination at the time of preparation, and hardly generates failure of the surface state is being demanded.

WO 05/061595 discloses a stretched cellulose ester film which contains at least one kind of an ester-based compound having an aromatic terminal consisting of an alkylene dicarboxylic acid residue having 4 to 12 carbon atoms, an alkylene glycol having 2 to 12 carbon atoms, and a benzene monocarboxylic acid. In addition, it is described that the use of an aromatic terminal ester-based compound has little breakage during the difficult production, has little adherence failure or dent failure upon long-term storage or transportation, and improves dimensional stability, and planarity.

JP-A-61-276836 discloses a cellulose derivative resin composition which contains a polyester consisting of a phthalic acid-based polyester and a dihydric alcohol, describing the improvement of irreversibility, non-volatility, and non-migrating property.

JP-A-2006-64803 discloses a stretched cellulose film which is a cellulose ester film containing a polyester polyol obtained from a glycol having an average number of carbon atoms of 2 to 3.5 and a (anhydrous) dihydrochloric acid having an average number of carbon atoms of 4 to 5.5, wherein the value of in-plane retardation is from 30 to 200 nm and the value of retardation in the thickness direction is in the range from 70 to 400 nm, describing the improvement of humidity stability.

JP-A-2007-3767 discloses a technology in which a polyester and a polyester ether, each having a mass average molecular weight of 400 to 5000, are added for the purpose of the preparation of a cellulose ester film which is excellent in prevention of raw material deposition, water vapor permeability, and dimension degree.

In addition, Plastic Zairyo Koza (Lecture on Plastic Material) (Vol. 17, Nikkan Kogyo Shinbun Sha, "Seniso-kei Jushi (Fiber-Based Resin)", p. 121, year of 1970) discloses triester phosphates such as triphenyl phosphate, phthalate esters, or the like as a plasticizer of a cellulose acylate film.

SUMMARY OF THE INVENTION

However, the cellulose ester films described in WO 05/061595 and JP-A-2006-64803 above had insufficient development of the optical characteristics so as to be applied in optically compensatory films in optical applications, and it was difficult to apply them to VA mode liquid crystal display devices which require high optical anisotropy.

Further, the cellulose ester films described in JP-A-61-276836 and JP-A-2007-3767 had low compatibility between a polyester or polyester polyol and a cellulose ester, and suffered from bleed-out at the time of film-forming or heating/stretching, whereby they are hard to be used practically.

In addition, the compound described in Plastic Zairyo Koza (Lecture on Plastic Material) above was also not satisfactory from the standpoints of a problem in the preparation facilities by volatilization of plasticizers and generation of failure of the surface state of a film, and in terms of its performance over time in the polarizing plate form.

It is an object of the present invention to provide excellent cellulose ester films, optically compensatory films, and polarizing plates, which have little failure of the surface state caused from process contamination at the time of preparation, hardly generates bleed-out, and has high production efficiency.

It is another object of the present invention to provide an optically compensatory film using the above-described cellulose ester film, which has a good surface state and is capable of controlling an Re value and an Rth value to desired values.

It is a further object of the present invention to provide an optically compensatory film and a polarizing plate, each using the above-described cellulose ester film, which have a low haze and high stability against the environment of high temperature and of high temperature and high humidity.

It is a further object of the present invention to provide a liquid crystal display device using the above-described cellulose ester film, optically compensatory film, and polarizing plate, which have good display quality.

The present inventors have carried out extensive inventions, and as a result, they have found that the above-described problems are solved by the following configurations.

[1]

A cellulose ester film including a polycondensate obtained from a diol and a dicarboxylic acid, the polycondensate containing the following (1) and (2):

(1) a dicarboxylic acid residue containing an aromatic dicarboxylic acid residue and an aliphatic dicarboxylic acid residue having an average carbon number of 4.0 to 5.0, wherein a ratio of the aromatic dicarboxylic acid residue represented by the following equation is from 40% by mole to 95% by mole:

The ratio of the aromatic dicarboxylic acid residue= [((the number of moles of the aromatic dicarboxylic acid residue)/((the number of moles of the aromatic dicarboxylic acid residue)+(the number of moles of the aliphatic dicarboxylic acid residues))]×100; and (2) an aliphatic diol residue having an average carbon number of 2.0 to 3.0.

[2]

The cellulose ester film as described in [1], wherein the aromatic dicarboxylic acid residue comprises a terephthalic acid residue.

[3]

The cellulose ester film as described in [1] or [2], wherein the polycondensate is a polyester polyol.

[4]

The cellulose ester film as described in [1] or [2], wherein a terminal of the polycondensate is an aliphatic monocarboxylic acid residue.

[5]

The cellulose ester film as described in any one of [1] to [4], wherein a number average molecular weight of the polycondensate is equal to or more than 800 and equal to or less than 2500.

[6]

The cellulose ester film as described in any one of [1] to [5], wherein the cellulose ester film comprises a cellulose acylate, and a substitution degree of an acyl group of the cellulose acylate film is from 2.10 to 2.95.

[7]

The cellulose ester film as described in any one of [1] to [6], wherein the cellulose ester film is obtained by stretching, and a stretch ratio is from 1% to 100% in the direction vertical to the conveyance direction (width direction of the cellulose ester film).

[8]

An optically compensatory film comprising a cellulose ester film as described in any one of [1] to [7].

[9]

A polarizing plate comprising: a polarizer and protective films adhered on respective sides of the polarizer, wherein at least one of the protective films is an optically compensatory film as described in [8].

[10]

A liquid crystal display device comprising a polarizing plate as described in [9].

DETAILED DESCRIPTION OF EXEMPLARY EMBODIMENTS

According to an exemplary embodiment of the present invention, excellent cellulose ester films, optically compensatory films, and polarizing plates, each of which has low process contamination at the time of preparation, hardly generates bleed-out, has high production efficiency and good surface state, and is capable of controlling an Re value and an Rth value to desired values, can be provided. Also, according to an exemplary embodiment of the present invention, excellent cellulose ester films, optically compensatory films, and polarizing plates, each of which has a low haze and high stability against the environment of high temperature and of high temperature and high humidity, can be provided. Further, a liquid crystal display device using the above-described film or polarizing plate, which has good display quality, can also be provided.

Hereinafter, exemplary embodiments of the present invention will be described in detail. Further, in the present specification, in the case where the numerical value represents a physical property value, a characteristic value, or the like, the description of the "(numerical value 1)~(numerical value 2)" and "(numerical value 1) to (numerical value 2)" each mean that it is equal to or more than "(numerical value 1) and equal to or less than (numerical value 2)".

A cellulose ester film of the present invention is a polycondensate containing the following (1) and (2) as a polycondensate obtained from a diol and a dicarboxylic acid:

(1) a dicarboxylic acid residue containing an aromatic dicarboxylic acid residue and an aliphatic dicarboxylic acid residue having an average carbon number of 4.0 to 5.0, wherein the ratio of the aromatic dicarboxylic acid residues represented by the following equation is from 40% by mole to 95% by mole:

Ratio of aromatic dicarboxylic acid residues(% by mole)=[Aromatic dicarboxylic acid residues (mol)/((Aromatic dicarboxylic acid residues (mol)+Aliphatic dicarboxylic acid residues (mol))]×100

(2) an aliphatic diol residue having an average carbon number of 2.0 to 3.0.

The cellulose ester film in the present invention can develop desired optical characteristics by incorporating the above-described polycondensate therein.

(Polycondensate)

The polycondensate according to the present invention is obtained, for example, from the diol and the dicarboxylic acid as described above.

The dicarboxylic acid residue of (1) contains an aromatic dicarboxylic acid residue and an aliphatic dicarboxylic acid residue having an average carbon number of 4.0 to 5.0, wherein the ratio of the aromatic dicarboxylic acid residues represented by the following equation is from 40% by mole to 95% by mole:

Ratio of aromatic dicarboxylic acid residues(% by mole)=[Aromatic dicarboxylic acid residues (mol)/(Aromatic dicarboxylic acid residues (mol)+Aliphatic dicarboxylic acid residues (mol))]×100

The average carbon atom number of the aliphatic dicarboxylic acid residue is a value calculated by multiplying a composition ratio (molar fraction) of the aliphatic dicarboxylic acid residue by the constitutional carbon atom number.

Further, the average carbon atom number of the aliphatic diol residue is a value calculated by multiplying a composition ratio (molar fraction) of the aliphatic diol residue by the constitutional carbon atom number. For example, in the case where it consists of 50% by mole of an ethylene glycol residue and 50% by mole of a 1,2-propanediol residue, the average carbon atom number is 2.5.

The number average molecular weight of the polycondensate is preferably from 800 to 2500, more preferably from 900 to 1800, and further preferably from 900 to 1250. If the number average molecular weight of the polycondensate is equal to or more than 800, the volatility is low and it is difficult to generate film failure or process contamination by volatilization under the condition of a high temperature at the time of stretching the cellulose ester film. Also, if the number average molecular weight of the polycondensate is equal to or less than 2500, the compatibility with a cellulose ester becomes higher, and thus it is difficult to generate bleed-out at the time of film-forming and heating/stretching.

The number average molecular weight of the polycondensate can be measured by a normal method by means of GPC (Gel Permeation Chromatography).

For example, measurement was carried out at a temperature of columns (TSKgel Super HZM-H, TSKgel Super HZ4000, and TSKgel Super HZ2000, manufactured by TOSOH CORPORATION) set at 40° C., using THF as an eluent, at a flow rate of 0.35 ml/min, and using a detection with RI, a feed amount of 10 µl, a sample concentration of 1 g/l, and a polystyrene as a standard sample.

The number average molecular weight of the polycondensate of the present invention is expressed by a value as measured by the above-described method.

The polycondensate according to the present invention can be used as a plasticizer.

(Aromatic Dicarboxylic Acid Residue)

An aromatic dicarboxylic acid residue is included in a polycondensate obtained from a diol and a dicarboxylic acid including an aromatic dicarboxylic acid.

In the present specification, the residue refers to a partial structure of a polycondensate, which is a partial structure having the characteristics of the monomers constituting the polycondensate. For example, the dicarboxylic acid residue formed from the dicarboxylic acid HOOC—R—COOH is —OC—R—CO—.

The ratio of the aromatic dicarboxylic acid residues of the polycondensate used in the present invention is from 40% by mole to 95% by mole, preferably from 45% by mole to 70% by mole, and more preferably from 50% by mole to 70% by mole.

By setting the ratio of the aromatic dicarboxylic acid residues to equal to or more than 40% by mole, a cellulose ester film developing sufficient optical anisotropy can be obtained. Further, if the ratio is equal to or less than 95% by mole, the compatibility with the cellulose ester is excellent and it can be made difficult to generate bleed-out at the time of forming the cellulose ester film and at the time of heating and stretching.

Examples of the aromatic dicarboxylic acid used in the present invention include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, and the like.

In the polycondensate, an aromatic dicarboxylic acid residue is formed from the aromatic dicarboxylic acid which is used for the mixing.

The aromatic dicarboxylic acid residue preferably has an average carbon number of 8.0 to 12.0, more preferably 8.0 to 10.0, and further preferably 8.0. Within this range, the compatibility with the cellulose ester is excellent and it is difficult to generate bleed-out at the time of forming the cellulose ester film and at the time of heating and stretching, which is thus preferable. Further, since the aromatic dicarboxylic acid residue can be used to make a cellulose ester film capable of sufficiently developing anisotropy suitable for the use in the optically compensatory film in optical applications, which is thus preferable.

Specifically, the aromatic dicarboxylic acid residue preferably contains at least one of a phthalic acid residue, a terephthalic acid residue, and an isophthalic acid residue, more preferably at least one of a phthalic acid residue and a terephthalic acid residue, and further preferably a terephthalic acid residue.

That is, by using a terephthalic acid as an aromatic dicarboxylic acid in the formation of a polycondensate, a cellulose ester film, in which the compatibility with the cellulose ester is more excellent and it is difficult to generate bleed-out at the time of forming the cellulose ester film and at the time of heating and stretching, can be made. Further, the aromatic dicarboxylic acids may be used singly or in combinations of two or more kinds thereof. In the case of using two kinds thereof, it is preferable to use phthalic acid and terephthalic acid.

By using phthalic acid and terephthalic acid as two kinds of aromatic dicarboxylic acid in combination, the polycondensate at the normal temperature can be softened, which is thus preferable from the viewpoint of making handling easy.

The content of the terephthalic acid residues in the dicarboxylic acid residues of the polycondensate is preferably from 40% by mole to 95% by mole, more preferably from 40% by mole to 70% by mole, and further preferably from 45% by mole to 60% by mole.

By setting the ratio of the terephthalic acid residues to equal to or more than 40% by mole, a cellulose ester film developing sufficient optical anisotropy can be obtained. Further, if the ratio is equal to or less than 95% by mole, the compatibility with the cellulose ester is excellent and it can be made difficult to generate bleed-out at the time of forming the cellulose ester film and at the time of heating and stretching.

(Aliphatic Dicarboxylic Acid Residue)

An aliphatic dicarboxylic acid residue is included in a polycondensate obtained from a diol and a dicarboxylic acid including an aliphatic dicarboxylic acid.

In the present specification, the residue refers to a partial structure of a polycondensate, which is a partial structure having the characteristics of the monomers constituting the polycondensate. For example, the dicarboxylic acid residue formed from the dicarboxylic acid HOOC—R—COOH is —OC—R—CO—.

Examples of the aliphatic dicarboxylic acid which is preferably used in the present invention include oxalic acid, malonic acid, succinic acid, maleic acid, fumaric acid, glutaric acid, adipic acid, pimelic acid, suberic acid, azelaic acid, sebacic acid, dodecane dicarboxylic acid, and 1,4-cyclohexane dicarboxylic acid.

In the polycondensate, an aliphatic dicarboxylic acid residue is formed from the aliphatic dicarboxylic acid used for the mixing.

The aliphatic dicarboxylic acid residue preferably has an average carbon number of 4.0 to 5.0, more preferably 4.0 to 4.9, and further preferably 4.0 to 4.8. Within this range, the compatibility with the cellulose ester is excellent, and it is difficult to generate bleed-out at the time of forming the cellulose ester film and at the time of heating and stretching, which is thus preferable.

Specifically, a succinic acid residue is preferably contained, and in the case of two kinds thereof, a succinic acid residue and an adipic acid residue are preferably contained.

That is, at least one or two kinds of the aliphatic dicarboxylic acids may be used for the mixing in the formation of a polycondensate, and in the case of two kinds thereof, succinic acid and adipic acid are preferably used.

By using succinic acid and adipic acid as two kinds of the aliphatic dicarboxylic acids, the average carbon number of the aliphatic dicarboxylic acid residue can be reduced, which is thus preferable from the viewpoint of compatibility with the cellulose ester.

Further, the average carbon number of the aliphatic dicarboxylic acid residue of less than 4.0 makes the synthesis hard and thus cannot be used.

(Aliphatic Diol)

An aliphatic diol acid residue is included in a polycondensate obtained from an aliphatic diol and a dicarboxylic acid.

In the present specification, the residue refers to a partial structure of a polycondensate, which is a partial structure having the characteristics of the monomers constituting the polycondensate. For example, the dicarboxylic acid residue formed from the diol HO—R—OH is —O—R—O—.

Examples of the diol which forms the polycondensate include an aromatic diol and an aliphatic diol, and an aliphatic diol is preferred.

The polycondensate includes (2) an aliphatic diol residue having an average carbon number of equal to or more than 2.0 and equal to or less than 3.0. It is preferably an aliphatic diol residue having an average carbon number of equal to or more than 2.0 and equal to or less than 2.8, and more preferably an average carbon number of equal to or more than 2.0 and equal to or less than 2.5. If the average carbon number of the aliphatic diol residue is more than 3.0, the compatibility with the cellulose ester is low and the bleed-out easily occurs, a loss on heating of the compound increases, and thus, failure of the surface state which is believed to result from process contamination at the time of drying the cellulose ester film is generated. Further, the average carbon number of the aliphatic diol residue of less than 2.0 makes the synthesis hard and thus cannot be used.

Examples of the aliphatic diol used in the present invention include alkyl diols or aliphatic diols, such as ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol(neopentyl glycol), 2,2-diethyl-1,3-propanediol(3,3-dimethylolpentane), 2-n-butyl-2-ethyl-1,3-propanediol(3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, and the like, and these are preferably used as a mixture of one kind or two or more kinds thereof in combination with ethylene glycol.

Preferable aliphatic diols are at least one of ethylene glycol, 1,2-propanediol, and 1,3-propanediol, and particularly preferably at least one of ethylene glycol and 1,2-propanediol. In the case of two or more kinds thereof, it is preferable to use ethylene glycol and 1,2-propanediol.

In the polycondensate, a diol residue is formed from the diol used for the mixing.

Examples of the diol residue preferably include at least one of an ethylene glycol residue, a 1,2-propanediol residue, and a 1,3-propanediol residue, and more preferably an ethylene glycol residue or a 1,2-propanediol residue.

Among the aliphatic diol residues, ethylene glycol residues are preferably at 20% by mole to 100% by mole, and more preferably at 50% by mole to 100% by mole.

(Sealing)

Both terminals of the polycondensate in the present invention may or may not be sealed.

In the case where both terminals of the condensate are not sealed, the polycondensate is preferably a polyester polyol.

In the case where both terminals of the condensate are sealed, it is preferable to allow it to undergo a reaction with a monocarboxylic acid to perform sealing. At this time, both terminals of the polycondensate are composed of monocarboxylic acid residues. In the present specification, the residue refers to a partial structure of a polycondensate, which is a partial structure having the characteristics of the monomers constituting the polycondensate. For example, the monocarboxylic acid residue formed from monocarboxylic acid R—COOH is R—CO—. It is preferably an aliphatic monocarboxylic acid residue, and the monocarboxylic acid residue is more preferably an aliphatic monocarboxylic acid residue having 2 to 22 carbon atoms, further preferably an aliphatic monocarboxylic acid residue having 2 to 3 carbon atoms, and particularly preferably an aliphatic monocarboxylic acid residue having 2 carbon atoms.

If the number of carbon atoms of the monocarboxylic acid residue at both terminals of the polycondensate is equal to or less than 3, the volatility is lowered, a loss on heating of the polycondensate is not significant, and it is possible to reduce generation of process contamination or failure of the surface state.

That is, the monocarboxylic acid used for sealing is preferably an aliphatic monocarboxylic acid. The monocarboxylic acid is more preferably an aliphatic monocarboxylic acid having 2 to 22 carbon atoms, more preferably an aliphatic monocarboxylic acid having 2 to 3 carbon atoms, and particularly preferably an aliphatic monocarboxylic acid residue having 2 carbon atoms.

For example, acetic acid, propionic acid, butanoic acid, benzoic acid, and a derivative thereof are preferred, acetic acid or propionic acid is more preferred, and acetic acid is most preferred. When a terminal is sealed by acetic acid, the sealed terminal is an acetyl ester residue. Similarly, when a terminal is sealed by propionic acid, butanoic acid, and benzoic acid, the sealed terminal is an propionyl ester residue, an butanoyl ester residue, and a benzoyl ester residue, respectively.

The monocarboxylic acids used for sealing may be in a mixture of two or more kinds thereof.

Both terminals of the polycondensate of the present invention are preferably sealed by acetic acid or propionic acid, and both terminals are particularly preferably sealed by acetic acid so that the sealed terminals are acetyl ester residues (sometimes referred to as acetyl residues).

In the case of sealing both terminals, it is difficult that the state at normal temperature becomes a solid form, handleability is improved, and it is possible to obtain a cellulose ester film which is excellent in humidity stability and polarizing plate durability.

Table 1 below shows specific examples of the polycondensate according to an exemplary embodiment of the present invention, but it should not be construed that the present invention is limited thereto.

TABLE 1

| | Dicarboxylic acid residue *1) | | | | | | | | | |
|---|---|---|---|---|---|---|---|---|---|---|
| | Aromatic dicarboxylic acid residue | Aliphatic dicarboxylic acid residue | Ratio of dicarboxylic acid residues (mol %) | Ratio of aromatic dicarboxylic acid residues (mol %) | Average carbon number of aliphatic dicarboxylic acid residue | Aliphatic diol residue | Ratio of diol residues (mol %) | Average carbon number of aliphatic diol residues | Both terminals | Number average molecular weight |
| P-1 | TPA/PA | SA/AA | 45/5/30/20 | 50 | 4.8 | Ethylene glycol | 100 | 2.0 | Acetyl ester residue | 700 |
| P-2 | TPA/PA | SA/AA | 45/5/30/20 | 50 | 4.8 | Ethylene glycol | 100 | 2.0 | Acetyl ester residue | 900 |
| P-3 | TPA/PA | SA/AA | 45/5/30/20 | 50 | 4.8 | Ethylene glycol | 100 | 2.0 | Acetyl ester residue | 1000 |
| P-4 | TPA/PA | SA/AA | 45/5/30/20 | 50 | 4.8 | Ethylene glycol | 100 | 2.0 | Acetyl ester residue | 1250 |
| P-5 | TPA/PA | SA/AA | 45/5/30/20 | 50 | 4.8 | Ethylene glycol | 100 | 2.0 | Acetyl ester residue | 1800 |
| P-6 | TPA/PA | SA/AA | 45/5/30/20 | 50 | 4.8 | Ethylene glycol | 100 | 2.0 | Acetyl ester residue | 2500 |
| P-7 | TPA/PA | SA/AA | 45/5/25/25 | 50 | 5.0 | Ethylene glycol | 100 | 2.0 | Acetyl ester residue | 1000 |
| P-8 | TPA/PA | SA/AA | 45/5/35/15 | 50 | 4.6 | Ethylene glycol | 100 | 2.0 | Acetyl ester residue | 1000 |
| P-9 | TPA/PA | SA/AA | 45/5/40/10 | 50 | 4.4 | Ethylene glycol | 100 | 2.0 | Acetyl ester residue | 1000 |
| P-10 | TPA/PA | SA | 45/5/50 | 50 | 4.0 | Ethylene glycol | 100 | 2.0 | Acetyl ester residue | 1000 |
| P-11 | TPA | SA | 40/60 | 40 | 4.0 | Ethylene glycol | 100 | 2.0 | Acetyl ester residue | 1000 |
| P-12 | TPA | SA | 50/50 | 50 | 4.0 | Ethylene glycol | 100 | 2.0 | Acetyl ester residue | 1000 |
| P-13 | TPA | SA | 60/40 | 60 | 4.0 | Ethylene glycol | 100 | 2.0 | Acetyl ester residue | 1000 |
| P-14 | TPA | SA | 70/30 | 70 | 4.0 | Ethylene glycol | 100 | 2.0 | Acetyl ester residue | 1000 |
| P-15 | TPA | SA | 60/40 | 60 | 4.0 | Ethylene glycol/1,2-propanediol | 50/50 | 2.5 | Acetyl ester residue | 1000 |
| P-16 | TPA | SA | 60/40 | 60 | 4.0 | 1,2-propanediol | 100 | 3.0 | Acetyl ester residue | 1000 |
| P-17 | TPA | SA | 50/50 | 50 | 4.0 | Ethylene glycol | 100 | 2.0 | Acetyl ester residue | 1250 |
| P-18 | TPA | SA | 50/50 | 50 | 4.0 | Ethylene glycol | 100 | 2.0 | Diol residue | 1250 |
| P-19 | TPA | SA | 50/50 | 50 | 4.0 | Ethylene glycol | 100 | 2.0 | benzoyl ester residue | 1250 |
| P-20 | PA | SA | 40/60 | 40 | 4.0 | Ethylene glycol | 100 | 2.0 | Acetyl ester residue | 1000 |
| P-21 | PA | SA | 50/50 | 50 | 4.0 | Ethylene glycol | 100 | 2.0 | Acetyl ester residue | 1000 |
| P-22 | PA | SA | 70/30 | 70 | 4.0 | Ethylene glycol | 100 | 2.0 | Acetyl ester residue | 1000 |
| P-23 | IPA | SA | 40/60 | 40 | 4.0 | Ethylene glycol | 100 | 2.0 | Acetyl ester residue | 1000 |
| P-24 | IPA | SA | 50/50 | 50 | 4.0 | Ethylene glycol | 100 | 2.0 | Acetyl ester residue | 1000 |
| P-25 | IPA | SA | 70/30 | 70 | 4.0 | Ethylene glycol | 100 | 2.0 | Acetyl ester residue | 1000 |
| P-26 | TPA/PA | SA | 20/30/50 | 50 | 4.0 | Ethylene glycol | 100 | 2.0 | Acetyl ester residue | 1000 |
| P-27 | TPA/PA | SA | 30/20/50 | 50 | 4.0 | Ethylene glycol | 100 | 2.0 | Acetyl ester residue | 1000 |
| P-28 | TPA/IPA | SA | 20/30/50 | 50 | 4.0 | Ethylene glycol | 100 | 2.0 | Acetyl ester residue | 1000 |
| P-29 | TPA/IPA | SA | 30/20/50 | 50 | 4.0 | Ethylene glycol | 100 | 2.0 | Acetyl ester residue | 1000 |
| P-30 | TPA/IPA | SA | 45/5/50 | 50 | 4.0 | Ethylene glycol | 100 | 2.0 | Acetyl ester residue | 1000 |
| P-31 | 2.6-NPA | SA | 50/50 | 50 | 4.0 | Ethylene glycol | 100 | 2.0 | Acetyl ester residue | 1000 |
| P-32 | 1.5-NPA | SA | 50/50 | 50 | 4.0 | Ethylene glycol | 100 | 2.0 | Acetyl ester residue | 1250 |
| P-33 | 1.4-NPA | SA | 50/50 | 50 | 4.0 | Ethylene glycol | 100 | 2.0 | Acetyl ester residue | 1250 |
| P-34 | 1.8-NPA | SA | 50/50 | 50 | 4.0 | Ethylene glycol | 100 | 2.0 | Acetyl ester residue | 1250 |
| P-35 | 2.8-NPA | SA | 50/50 | 50 | 4.0 | Ethylene glycol | 100 | 2.0 | Acetyl ester residue | 1250 |

TABLE 1-continued

| | Dicarboxylic acid residue *1) | | | | | | | | | |
|---|---|---|---|---|---|---|---|---|---|---|
| | Aromatic dicarboxylic acid residue | Aliphatic dicarboxylic acid residue | Ratio of dicarboxylic acid residues (mol %) | Ratio of aromatic dicarboxylic acid residues (mol %) | Average carbon number of aliphatic dicarboxylic acid residue | Aliphatic diol residue | Ratio of diol residues (mol %) | Average carbon number of aliphatic diol residues | Both terminals | Number average molecular weight |
| P-36 | TPA/2.6-NPA | SA | 25/25/50 | 50 | 4.0 | Ethylene glycol | 100 | 2.0 | Acetyl ester residue | 1250 |
| P-37 | PA/2.6-NPA | SA | 25/25/50 | 50 | 4.0 | Ethylene glycol | 100 | 2.0 | Acetyl ester residue | 1250 |
| P-38 | IPA/2.6-NPA | SA | 25/25/50 | 50 | 4.0 | Ethylene glycol | 100 | 2.0 | Acetyl ester residue | 1250 |
| P-39 | TPA | SA | 50/50 | 50 | 4.0 | Ethylene glycol | 100 | 2.0 | Propionyl ester residue | 1000 |
| P-40 | TPA | SA | 50/50 | 50 | 4.0 | Ethylene glycol | 100 | 2.0 | Butanoyl ester residue | 1000 |
| P-41 | TPA | SA | 50/50 | 50 | 4.0 | Ethylene glycol/ 1,3-propanediol | 50/50 | 2.5 | Acetyl ester residue | 1000 |
| P-42 | TPA | SA | 50/50 | 50 | 4.0 | 1,3-propanediol | 100 | 3.0 | Acetyl ester residue | 1000 |
| P-43 | TPA/PA | SA/AA | 45/5/30/20 | 50 | 4.8 | Ethylene glycol | 100 | 2.0 | Acetyl ester residue | 800 |
| P-44 | TPA/PA | SA/AA | 45/5/30/20 | 50 | 4.8 | Ethylene glycol | 100 | 2.0 | Acetyl ester residue | 2700 |

*1) PA: phthalic acid, TPA: terephthalic acid, IPA: isophthalic acid, SA: succinic acid, AA: adipic acid, 2,6-NPA: 2,6-naphthalene dicarboxylic acid, 2,8-NPA: 2,8-naphthalene dicarboxylic acid, 1,5-NPA: 1,5-naphthalene dicarboxylic acid, 1,4-NPA: 1,4-naphthalene dicarboxylic acid, 1,8-NPA: 1,8-naphthalene dicarboxylic acid In the calculation of a solubility parameter (SP value (HOY method)) of the polycondensate described in Table 1, the value was, for example, a value close to 22.0 which is an SP value for a cellulose acylate having P-3 of 22.3 (MPa)$^{1/2}$, P-15 of 22.1 (MPa)$^{1/2}$, P-41 of 22.2 (MPa)$^{1/2}$, an acetyl substitution degree of 2.81, and a number average molecular weight of 88000.

The polycondensed ester according to the invention can be easily synthesized in a normal way by any one of a hot melt condensation process, by a polyesterification reaction or a transesterification reaction between a diol and a dicarboxylic acid, or an interface condensation process among acid chlorides of these acids and glycols. Also, the polycondensed ester according to the invention is described in detail in Koichi Murai, "Plasticizer-Theory and Application" (First Edition, First Impression, published by Saiwai Shobo, Mar. 1, 1973). Further, the raw materials disclosed in JP-A-05-155809, JP-A-05-155810, JP-A-5-197073, JP-A-2006-259494, JP-A-07-330670, JP-A-2006-342227, JP-A-2007-003679, and the like can be used.

The content of the polycondensate in the cellulose ester film is preferably from 0.1 to 30% by mass, more preferably from 5 to 20% by mass, and most preferably from 7 to 15% by mass based on the amount of the cellulose ester.

The content of the raw materials, the aliphatic diol, the dicarboxylic acid ester, or the diol ester to be contained in the polycondensate in the present invention is preferably less than 1% by mass, and more preferably less than 0.5% by mass in the cellulose ester film. Examples of the dicarboxylic acid ester include dimethyl phthalate, di(hydroxyethyl)phthalate, dimethyl terephthalate, di(hydroxyethyl)terephthalate, di(hydroxyethyl)adipate, di(hydroxyethyl)succinate, and the like. Examples of the diol ester include ethylene diacetate, propylene diacetate, and the like.

The kind and ratio of each respective residue of the dicarboxylic acid residue, the diol residue, and the monocarboxylic acid residue to be contained in the polycondensate used in the present invention can be measured in a normal way using H-NMR. Usually, dichloroform can be used a solvent.

The number average molecular weight of the polycondensate can be measured in a normal way using GPC (Gel Permeation Chromatography).

For example, measurement can be carried out by using columns (TSKgel Super HZM-H, TSKgel Super HZ4000, and TSKgel Super HZ2000, all manufactured by Tosoh Corporation) at a temperature of 40° C., THF as an eluent, and a flow rate of 0.35 ml/min, and using the detection with RI, a feed amount of 10 μl a sample concentration of 1 g/l, and polystyrene as a standard sample.

An acetic anhydride method as described in Japan Industrial Standard JIS K3342 (abrogated) or the like can be applied for measurement of the hydroxyl value of the polycondensate. In the case where the polycondensate is a polyester polyol, the hydroxyl value is preferably equal to or more than 55 and equal to or less than 220, and more preferably equal to or more than 100 and equal to or less than 140.

(Compound Having at Least Two Aromatic Rings)

It is preferable that the cellulose ester film in the present invention further contains a compound having at least two aromatic rings.

Hereinafter, the compound having at least two aromatic rings is described.

It is preferable that when uniformly aligned, the compound having at least two aromatic rings develops optically positive uniaxiality.

The molecular weight of the compound having at least two aromatic rings is preferably from 300 to 1,200, and more preferably from 400 to 1,000.

In the case where the cellulose ester film in the present invention is used as an optically compensatory film, in order to control optical characteristics, in particular Re to preferred values, stretching is effective. For the purpose of raising the Re, it is necessary to increase the refractive index anisotropy within the film plane, and one method thereof is to enhance the alignment of a principal chain of the polymer film by stretching. Also, by using a compound with large refractive index anisotropy, it is possible to further raise the refractive index anisotropy of the film. For example, in the above-described compound having at least two aromatic rings, when a force by which the polymer principal chain is arranged conducts due to stretching, the alignment properties of the compound are enhanced, whereby it becomes easy to control the desired optical characteristics.

Examples of the compound having at least two aromatic rings include triazine compounds described in JP-A-2003-344655, rod-shaped compounds described in JP-A-2002-363343, liquid crystalline compounds described in JP-A-2005-134884 and JP-A-2007-119737, and the like. The aforementioned triazine compounds or rod-shaped compounds are more preferred.

The compound having at least two aromatic rings can also be used in combinations of two or more kinds thereof.

The addition amount of the compound having at least two aromatic rings is preferably equal to or more than 0.1% and equal to or less than 30%, more preferably equal to or more than 0.5% and equal to or less than 20%, further preferably equal to or more than 1% and equal to or less than 10%, and particularly preferably equal to or more than 3% and equal to or less than 7% in terms of a mass ratio relative to the cellulose ester.

Next, the cellulose ester film which can be used for an optically compensatory film, a polarizing plate, and the like is described in detail.
(Cellulose Ester)

In the cellulose ester film in the present invention, examples of the cellulose ester include cellulose ester compounds, and compounds having an ester-substituted cellulose structure, which are obtained by biologically or chemically introducing a functional group into cellulose as a raw material.

The above-described cellulose ester is an ester of cellulose and an acid. The acid constituting the ester is preferably an organic acid, more preferably a carboxylic acid, further preferably a fatty acid having 2 to 22 carbon atoms, and most preferably a lower fatty acid having 2 to 4 carbon atoms.
(Cellulose Acylate Raw Material Cotton)

Examples of the cellulose of the cellulose acylate raw material to be used in the present invention include cotton linter, wood pulps (for example, hardwood pulps and soft wood pulps), and the like, and cellulose acylates obtained from any of these raw material celluloses can be used. If desired, a mixture thereof may be used. These raw material celluloses are described in detail in, for example, "Course of Plastic Materials (17) Cellulose Resins" (written by Marusawa and Uda and published by Nikkan Kogyo Shimbun, Ltd in 1970); and Journal of Technical Disclosure, No. 2001-1745 (pages 7 to 8) by Japan Institute of Invention and Innovation. However, it should not be construed that the cellulose acylate film of the present invention is limited thereto.
(Substitution Degree of Cellulose Acylate)

Hereinafter, the cellulose acylate manufactured from the above-described cellulose as a raw material, which is suitable in the present invention, is described.

The cellulose acylate which is used in the present invention is one obtained by acylating the hydroxyl groups of cellulose. As the substituent, any of substituents inclusively from an acetyl group having 2 carbon atoms to an acyl group having 22 carbon atoms can be used. In the present invention, the substitution degree on hydroxyl groups of cellulose in the cellulose acylate is not particularly limited. The substitution degree can be obtained by measuring a degree of bond of acetic acid and/or a fatty acid having 3 to 22 carbon atoms, which is substituted on hydroxyl groups of cellulose, and then calculating. The measurement method can be carried out in accordance with ASTM D-817-91.

The cellulose ester film includes cellulose acylate and the substitution degree of the acyl group of the cellulose acylate film is preferably from 2.10 to 2.95, more preferably from 2.40 to 2.95, further preferably from 2.70 to 2.95, and particularly preferably from 2.80 to 2.95.

If the acyl substitution degree is equal to or more than 2.10, the film is sufficient in terms of humidity stability and polarizing plate durability, whereas if the acyl substitution degree is equal to or less than 2.95, a cellulose ester film having excellent solubility in an organic solvent and compatibility with a polycondensate can be obtained, which is thus preferable.

As for the acetic acid and/or the fatty acid having 3 to 22 carbon atoms, which is substituted on hydroxyl groups of cellulose, the acyl group having 2 to 22 carbon atoms may be an aliphatic group or an aryl group and is not particularly limited, and also it may be a single group or a mixture of two or more kinds thereof. Examples thereof include alkyl carbonyl esters, alkenyl carbonyl esters, aromatic carbonyl esters and aromatic alkyl carbonyl esters of cellulose. These may further have a substituted group. Examples of the preferable acyl group include acetyl, propionyl, butanoyl, heptanoyl, hexanoyl, octanoyl, decanoyl, dodecanoyl, tridecanoyl, tetradecanoyl, hexadecanoyl, octadecanoyl, i-butanoyl, t-butanoyl, cyclohexanecarbonyl, oleoyl, benzoyl, naphthylcarbonyl, cinnamoyl, and the like. Of these, acetyl, propionyl, butanoyl, dodecanoyl, octadecanoyl, t-butanoyl, oleoyl, benzoyl, naphthylcarbonyl, cinnamoyl, and the like are preferred, acetyl, propionyl, and butanoyl are more preferred, acetyl and propionyl are further preferred, and acetyl is most preferred.

Of the acyl substituents substituting on hydroxyl groups of cellulose, in the case where the acyl substituent is substantially composed of at least two kinds of an acetyl group, a propionyl group and a butanoyl group, its total substitution degree is preferably from 2.10 to 2.95. The degree substitution of acyl is more preferably from 2.40 to 2.95, and further preferably from 2.50 to 2.95.

In the case where the acyl substituent of the cellulose acylate is composed of just an acetyl group, its total substitution degree is preferably from 2.10 to 2.95. Furthermore, the substitution degree is preferably from 2.40 to 2.95, more preferably from 2.70 to 2.95, and further preferably from 2.80 to 2.95.
(Polymerization Degree of Cellulose Acylate)

The polymerization degree of the cellulose acylate which is preferably used in the present invention is preferably from 180 to 700 in terms of a viscosity average polymerization degree. In the cellulose acetate, the polymerization degree is more preferably from 180 to 550, further preferably from 180 to 400, and particularly preferably from 180 to 350. When the polymerization degree is not more than the above-described upper limit value this is preferable because the viscosity of a dope solution of the cellulose acylate does not become excessively high, and the film preparation by means of casting can be easily achieved. When the polymerization degree is the above-described lower limit value or more this is preferable because inconveniences such as a lowering of the strength of a prepared film do not occur. The viscosity average polymerization degree can be measured by an intrinsic viscosity method by Uda, et al. (Kazuo Uda and Hideo Saito, "Sen'i Gakkaishi (Journal of the Society of Fiber Science and Technology)", Vol. 18, No. 1, pages 105 to 120 (1962)). This method is also disclosed in detail in JP-A-9-95538.

Also, the molecular weight distribution of the cellulose acylate which is preferably used in the present invention is evaluated by means of gel permeation chromatography. It is preferable that its polydispersity index Mw/Mn (Mw: mass average molecular weight, Mn: number average molecular weight) is small and that the molecular weight distribution is narrow. A specific value of Mw/Mn is preferably from 1.0 to 4.0, more preferably from 2.0 to 4.0, and most preferably from 2.3 to 3.4.

(Preparation of Cellulose Acylate Film)

The cellulose acylate film in the present invention can be prepared by a solvent casting process. In the solvent casting process, a film is manufactured by using a solution (dope) of the cellulose acylate dissolved in an organic solvent.

Next, the above-described organic solvent in which the cellulose ester of the present invention is dissolved is described.

In the present invention, as the organic solvent, a chlorine-based solvent having a chlorine-based organic solvent as a main solvent and a non-chlorine-based solvent having no chlorine-based organic solvent can be used. Solubility is better with the use of two or more kinds of the organic solvents.

In the preparation of a solution of the cellulose ester in the present invention, a chlorine-based organic solvent is preferably used as a main solvent. In the present invention, the kind of the chlorine-based organic solvent is not particularly limited as long as it allows a cellulose ester to be dissolved therein to form a film, thereby accomplishing the purpose. Such a chlorine-based organic solvent is preferably dichloromethane or chloroform, and particularly preferably dichloromethane. Further, an organic solvent in addition to the chlorine-based organic solvent may be mixed without any particular problem. In such a case, it is necessary to use at least 50% by mass of dichloromethane relative to the total amount of the organic solvent. The other organic solvent to be used in combination with the chlorine-based organic solvent in the present invention is described below. That is, as the preferable other organic solvents, a solvent selected from esters, ketones, ethers, alcohols, hydrocarbons, each having 3 to 12 carbon atoms is preferred. The esters, ketones, ethers, and alcohols may each have a cyclic structure. Compounds having any two or more of ether, ketone and ester functional groups (namely, —O—, —CO—, and —COO—) can also be used as the organic solvent. The organic solvent may have another functional group such as an alcoholic hydroxyl group at the same time. In the case of a solvent having two or more kinds of functional groups, it is preferable that the number of carbon atoms falls within a defined range of a compound having any one of the functional groups.

Examples of the ester having 3 to 12 carbon atoms include ethyl formate, propyl formate, pentyl formate, methyl acetate, ethyl acetate, pentyl acetate, and the like. Examples of the ketone having 3 to 12 carbon atoms include acetone, methyl ethyl ketone, diethyl ketone, diisobutyl ketone, cyclopentanone, cyclohexanone, methylcyclohexanone, and the like. Examples of the ether having 3 to 12 carbon atoms include diisopropyl ether, dimethoxymethane, dimethoxyethane, 1,4-dioxane, 1,3-dioxolan, tetrahydrofuran, anisole, phenetole, and the like. Examples of the organic solvent having two or more kinds of functional groups include 2-ethoxyethyl acetate, 2-methoxyethanol, 2-butoxyethanol, and the like.

Also, the alcohol to be used in combination with the chlorine-based organic solvent may be preferably straight-chain, branched or cyclic. Among these alcohols, a saturated aliphatic hydrocarbon is preferred. The hydroxyl group in the alcohol may be any of primary to tertiary hydroxyl groups. Examples of the alcohol employable herein include methanol, ethanol, 1-propanol, 2-propanol, 1-butanol, 2-butanol, t-butanol, 1-pentanol, 2-methyl-2-butanol, and cyclohexanol. As the alcohol there may be used a fluorine-based alcohol. Examples thereof include 2-fluoroethanol, 2,2,2-trifluoroethanol, 2,2,3,3-tetrafluoro-1-propanol, and the like. Further, the hydrocarbon may be preferably straight-chain, branched or cyclic. Any of an aromatic hydrocarbon and an aliphatic hydrocarbon can be used. The aliphatic hydrocarbon may be saturated or unsaturated. Examples of the hydrocarbon include cyclohexane, hexane, benzene, toluene, and xylene.

As the other solvent, for example, the solvents described in JP-A-2007-140497 can be used.

By a general method including treatment at a temperature of 0° C. or higher (normal temperature or high temperature), a cellulose ester solution can be prepared. The preparation of the solution can be carried out by a preparation method and device for a dope in a normal solvent casting process. Further, in a general method, it is preferable to use halogenated hydrocarbons (particularly dichloromethane) and alcohols (particularly methanol, ethanol, 1-propanol, 2-propanol, 1-butanol, 2-butanol, t-butanol, 1-pentanol, 2-methyl-2-butanol, and cyclohexanol) as an organic solvent.

It is preferable that the cellulose ester solution is prepared such that the cellulose ester is contained in an amount from 10 to 40% by mass in the obtained solution. The amount of the cellulose ester is more preferably from 10 to 30% by mass. Arbitrary additives as described later may be added in the organic solvent (main solvent).

The solution can be prepared by stirring the cellulose ester and the organic solvent at a normal temperature (from 0 to 40° C.). The high-concentration solution may be stirred under pressurization and heating conditions. Specifically, the cellulose ester and the organic solvent are put in a pressure vessel and hermetically sealed, and the mixture is stirred under pressure while heating at a temperature of the boiling point of the solvent at a normal temperature or higher and falling within the range where the solvent does not boil. Further, the mixture can also be stirred at a normal temperature, followed by pressurization and heating, or can stirred at a normal temperature, followed by stirring under pressurization and heating conditions.

The heating temperature is usually 40° C. or higher, preferably from 60 to 200° C., more preferably from 80 to 120° C., and particularly preferably from 90 to 115° C.

The respective components may be coarsely mixed and then put in the vessel. Also, the components may be successively charged in the vessel. It is necessary that the vessel is configured such that stirring can be achieved. The vessel can be pressurized by pouring an inert gas such as a nitrogen gas. Also, a rise in the vapor pressure of the solvent due to heating may be utilized. Alternatively, after hermetically sealing the vessel, the respective components can be added under a pressure.

In the case of carrying out heating, it is preferable that heating is carried out from the outside of the vessel. For example, a jacket type heating apparatus can be used. Also, the whole of the vessel can be heated by providing a plate heater on the outside of the vessel, laying a pipe and circulating a liquid thereinto.

It is preferred to provide a stirring blade in the inside of the vessel and carry out stirring using this. The stirring blade is preferably one having a length so as to reach the vicinity of a wall of the vessel. It is preferable that a scraping blade is provided at the terminal of the stirring blade for the purpose of renewing a liquid film of the wall of the vessel.

Measuring instruments such as a pressure gauge and a thermometer may be provided in the vessel. In the vessel, the respective components are dissolved in a solvent. The prepared dope is cooled and then taken out from the vessel, or taken out from the vessel and then cooled by using a heat exchanger or the like.

In addition, other two or more solutions may be respectively prepared in separate vessels, and then, each of the solutions may be mixed to prepare a dope. Each of the solutions may be added in-line to the dope which has been first prepared.

(Casting)

The cellulose ester film is manufactured from the prepared cellulose ester solution (dope) by a solvent casting process. It is preferable to add the above-described compound having at least two aromatic rings to the dope.

The dope is cast on a drum or a band, and the solvent is vaporized to form a film. It is preferable that the dope before casting is adjusted so as to have a concentration in the range of 5 to 40% in terms of solids content. It is preferable that the surface of the drum or band is mirror-finished. It is preferable that the dope is cast on the drum or band having a surface temperature of not higher than 30° C., and particularly preferably a metal support temperature of −10° C. to 20° C. Further, the methods described in each of the publications of JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511, and JP-A-02-208650 can be used in the present invention.

(Drying)

Drying of the dope on the metal support which is concerned with the preparation of the cellulose ester film includes generally a method of applying a blown heat on the side of the surface of a metal support (for example, drum or band), that is, from the surface of a web on the metal support, a method of applying a blown heat on the rear face of the drum or the band, a liquid heat conduction method of bringing a liquid controlled for the temperature in contact with the rear face, that is, on the side opposite to the dope casting surface of the band or the drum and heating the drum or the band by heat conduction thereby controlling the surface temperature, with the rear face liquid heat conduction system being preferred. The surface temperature of the metal support before casting may be at any level so long as it is lower than the boiling point of the solvent used for the dope. However, for promoting drying or eliminating the fluidity of the metal support, it is preferred to set a temperature lower by 1 to 10° C. than the boiling point of the solvent having the lowest boiling point among the solvents used. This is not applied to a case of cooling the cast dope and peeling off the same without drying.

The Re value and the Rth value of the cellulose ester film can also be adjusted by controlling the temperature on the metal support on which a dope film is cast, the temperature of drying air applied on a dope film cast on a metal support, and a circumstance. Particularly, the Rth value is greatly affected by the drying condition on the metal support. By increasing the temperature of the metal support or increasing the temperature of the drying air applied onto the dope film and increasing the air amount of the drying air, that is, increasing the calorie applied onto the dope film, the Rth value is lowered, whereas by decreasing the calorie, the Rth is increased. The drying of the front part particularly from immediately after casting to peeling-off greatly affects the Rth value.

The drying method in the solvent casting process is described in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430, JP-A-62-115035. Drying on the band or drum can be carried out while blowing an inert gas such as air, nitrogen, and the like.

The obtained film is peeled off from the drum or band and further dried by high-temperature air while successively changing the temperature from 100 to 160° C., whereby the residual solvent can be evaporated. The above-described method is disclosed in JP-B-5-17844. According to this method, it is possible to shorten the time from casting to peeling-off In order to carry out this method, it is necessary that the dope is gelled at the surface temperature of the drum or band at the time of casting.

The formation of a film can also be carried out by using two or more kinds of dopes when the dope is cast in the solution film-forming method of the present invention.

As a method using two or more kinds of dopes, simultaneous stacking co-casting or sequential stacking co-casting can also be carried out. Also, both the co-casting methods may be combined. When the simultaneous stacking co-casting is carried out, a casting die equipped with a feed block may be used, and a multi-manifold casting die may also be used. For a film formed of multiple layers by co-casting, at least one of the thickness of a layer facing air and the thickness of a layer facing the support is preferably from 0.5% to 30% relative to the total thickness of the film.

In the case of carrying out the simultaneous stacking co-casting, when the dope is cast onto the support from the die slit, it is preferable that the high-viscosity dope is covered with the low-viscosity dope. Further, the solid concentration of the dope in the outer layer is preferably equal to or less than the solid concentration of the dope in the inner layer, and it is more preferably a low concentration of equal to or more than 1% by mass, and further preferably a low concentration of equal to or more than 3% by mass. Further, it is preferable that the composition ratio of the alcohol in the dope in contact with the outer system is equal to or more than the composition ratio of the alcohol in the dope in contact with the internal system. The addition amount of the alcohol in the dope of the outer layer is preferably from 1.0 to 6.0 times, more preferably from 1.0 to 4.0 times relative to the inner layer, and particularly preferably from 1.0 to 3.0 times, relative to the inner layer.

Also, a film can be prepared by using two casting nozzles, peeling-off a film formed on a support by a first casting nozzle and then subjecting the side of the film coming into contact with the support surface to second casting. For example, a method described in JP-B-44-20235 can be exemplified.

With respect to the cellulose ester solutions to be cast, the same solution may be used, or different cellulose ester solutions may be used. For the purpose of making plural cellulose ester layers have a function, a cellulose ester solution corresponding to the respective function may be extruded from the respective casting nozzle. Furthermore, the cellulose ester solution of the present invention can be cast simultaneously with another functional layer (for example, an adhesive layer, a dye layer, an antistatic layer, an anti-halation layer, an ultraviolet ray absorbing layer, a polarizing layer, and the like).

In single-layer solutions in the background art, in order to bring the film with a desired thickness, it is necessary to extrude a high-viscosity cellulose ester solution in a high concentration. In that case, there was often encountered a problem that the stability of the cellulose ester solution is so poor that solids are generated, thereby causing a spitting fault or inferiority in planarity. As a method for solving this problem, by casting plural cellulose ester solutions from casting nozzles, high-viscosity solutions can be extruded onto the support at the same time, and a film having improved planarity and excellent surface state can be prepared. Also, by using concentrated cellulose ester solutions, a reduction of a drying load can be achieved, and the production speed of the film can be enhanced.

The width of the cellulose ester film of the present invention is preferably from 1 to 5 m, and more preferably from 1 to 3 m. The winding length of the film is preferably from 300 to 10000 m, more preferably from 1000 to 8000 m, and further preferably from 1000 to 7000 m.

(Film Thickness)

A film thickness of the cellulose ester film of the present invention is preferably from 20 μm to 180 μm, more preferably from 30 μm to 120 μm, and further preferably from 40 μm to 100 μm. When the film thickness is equal to or more than 20 μm this is preferable in view of handling properties during processing into a polarizing plate or the like and curl inhibition of a polarizing plate. Also, unevenness in film thickness of the cellulose ester film of the present invention is preferably from 0 to 2%, more preferably from 0 to 1.5%, and particularly preferably from 0 to 1% in any of the conveyance direction and the width direction.

(Additives)

In the cellulose ester film, a deterioration preventing agent (for example, an antioxidant, a peroxide decomposing agent, a radical inhibitor, a metal inactivating agent, an acid scavenger, and an amine) may be added. The deterioration preventing agent is disclosed in each of the publications of JP-A-3-199201, JP-A-5-194789, JP-A-5-271471, and JP-A-6-107854. From the viewpoints of developing an effect by the addition of the deterioration preventing agent and suppressing bleed-out (diffusing-out) of the deterioration preventing agent onto the film surface, the addition amount of the deterioration preventing agent is preferably from 0.01 to 1% by mass, and more preferably from 0.01 to 0.2% by mass relative to the solution (dope) to be prepared.

Examples of the particularly preferable deterioration preventing agent include butylated hydroxytoluene (BHT) and tribenzylamine (TBA).

An ultraviolet absorber may be added to the cellulose ester film of the present invention. As the ultraviolet absorber, the compounds described in JP-A-2006-282979 (benzophenone, benzotriazole, and triazine.) are preferably used. The ultraviolet solvent can be used in combinations of two or more kinds thereof.

As the ultraviolet absorber, benzotriazole is preferable, and specific examples thereof include TINUVIN 328, TINUVIN 326, TINUVIN 329, TINUVIN 571, ADEKASTAB LA-31, and the like.

The amount of the ultraviolet absorber to be used is preferably equal to or less than 10%, more preferably equal to or less than 3%, and most preferably equal to or less than 2% and equal to or more than 0.05% in terms of a mass ratio relative to the cellulose ester.

(Matting Agent Fine Particle)

It is preferable that the cellulose ester film of the present invention contains a fine particle as a matting agent. Examples of the fine particle which is used in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. As the fine particle, those containing silicon are preferable in view of the matter that the turbidity is low, and silicon dioxide is especially preferable. As the fine particle of silicon dioxide, those having a primary average particle size of equal to or less than 20 nm and an apparent specific gravity of equal to or more than 70 g/L are preferable. One having a small average particle size of primary particle as from 5 to 16 nm is more preferable because the haze of the film can be reduced. The apparent specific gravity is preferably from 90 to 200 g/L or more, and more preferably from 100 to 200 g/L or more. A larger apparent specific gravity is preferable since a dispersion with a high concentration can be prepared, and the haze and the coagulated material are improved. A desired embodiment is described in detail on pages 35 to 36 of Journal of Technical Disclosure of Japan Institute of Invention and Innovation (Technical Disclosure No. 2001-1745, issued on Mar. 15, 2001, Japan Institute of Invention and Innovation) and can also be preferably used in the cellulose ester film of the present invention.

(Stretching)

In the cellulose ester film of the present invention, the retardation can be adjusted by a stretching treatment. A method for positively stretching the film in the width direction (a direction vertical to the conveyance direction) is disclosed in, for example, each of the publications of JP-A-62-115035, JP-A-4-152125, JP-A-4-284211, JP-A-4-298310, and JP-A-11-48271. Stretching of the film is carried out under normal temperature or heating condition. The heating temperature is preferably within the range from −20° C. to +100° C., including the glass transition temperature of the film therebetween. When the film is stretched at a temperature extremely lower than the glass transition temperature, the film is easily broken, whereby the desired optical characteristics cannot be developed. Also, when the film is stretched at a temperature extremely higher than the glass transition temperature, the film is relaxed by the heat at the time of stretching before one having been subjected to molecular alignment is thermally fixed, and the alignment cannot be fixed, whereby the revelation properties of optical characteristics are deteriorated.

Stretching of the film may be uniaxial stretching in only a conveyance direction or a width direction, or may be simultaneous or sequential biaxial stretching. However, it is preferable that stretching is carried out predominantly in a width direction. For stretching in the width direction, the stretching is preferably carried out at 1 to 100%, more preferably 10 to 70%, and particularly preferably 20% to 60%, For stretching in the conveyance direction, the stretching is preferably carried out at 1 to 10%, and particularly preferably 2 to 5%.

In the present invention, the cellulose ester film is obtained by such stretching and the stretch ratio is preferably equal to or more than 1% and equal to or less than 100% in the direction vertical to the conveyance direction (width direction).

The stretching treatment may be carried out during a film-forming step, and a raw fabric which has been subjected to film-forming and winding-up may be subjected to a stretching treatment.

In the case where stretching is carried out during a film-forming step, stretching may also be carried out in the state including a residual solvent, and stretching can be preferably carried out at a residual solvent amount [(mass of residual volatile component)/(film mass after heat treatment)×100%] of 0.05 to 50%.

In the case where a raw fabric which has been subjected to film-forming and winding-up is stretched, stretching is preferably carried out at 1 to 100%, more preferably 10 to 70%, and particularly preferably 20% to 60%, in the width direction in the state that a residual solvent amount is from 0 to 5%.

The stretching treatment may be carried out during a film-forming step, and a raw fabric which has been subjected to film-forming and winding-up may be further subjected to a stretching treatment.

In the case where the film which had been subjected to a stretching treatment during the film-forming step is subjected to winding-up and then is further subjected to a stretching treatment, the stretching during the film-forming step may also be carried out in the state including a residual solvent, and the stretching is preferably carried out at a residual solvent amount [(mass of residual volatile component)/(film mass after heat treatment)×100%] of 0.05 to 50%. For stretching of the raw fabric which has been subjected to film-forming and winding-up, stretching is preferably carried out in the state that a residual solvent amount is from 0 to 5%, and for stretching in the width direction, stretching is preferably carried out at 1 to 100%, more preferably 10 to 70%, and particularly preferably 20% to 60%, based on the unstretched state.

Also, the cellulose ester film of the present invention may be subjected to biaxial stretching.

The biaxial stretching includes a simultaneous biaxial stretching process and a sequential biaxial stretching process. From the viewpoint of continuous preparation, a sequential biaxial stretching process is preferable. After casting the dope, the film is peeled off from the band or drum and stretched in the width direction and then in a longitudinal direction, or stretched in a longitudinal direction and then in a width direction.

In order to relax the residual deformation in stretching, reduce the dimensional change, and decrease the unbalance to the width direction of the in-plane slow axis, it is preferable to provide a relaxation step after a transverse stretching. In the relaxing step, the film width after relaxation is preferably controlled in the range of 100 to 70% relative to the film width after relaxation (relaxation rate: 0 to 30%). The temperature at the relaxing step is preferably from an apparent glass transition temperature of the film Tg-50 to Tg+50° C. In normal stretching, in a relaxation rate zone after going through this maximum widening rate, a time until the film passes through a tenter zone is shorter than one minute.

Here, apparent Tg of the film at the stretching step is determined by enveloping the film including the residual solvent with an aluminum pan, raising the temperature from 25° C. to 200° C. at a temperature rise rate of 20° C./min by means of a differential scanning calorimeter (DSC), and then determining a heat absorption curve.

(Drying after Stretching)

In the case where stretching treatment is carried out during the film-forming step, the film can be dried in the state where it is conveyed. The drying temperature is preferably from 100° C. to 200° C., more preferably from 100° C. to 150° C., further preferably from 110° C. to 140° C., and particularly preferably from 130° C. to 140° C. The drying time is not particularly limited, but it is preferably from 10 minutes to 40 minutes.

By choosing an optimal temperature for drying after stretching, the residual stress of the prepared cellulose ester film is relaxed, and the dimensional change, the optical characteristic change, and the slow axis azimuth change, each under high temperature and under high temperature and high humidity, can be reduced.

(Heat Treatment)

In the case where the raw fabric which had been subjected to film-forming and then winding-up is stretched, the film which has been subjected to a stretching treatment may be prepared thereafter through a further heat treatment step. By passing it through the heat treatment step, the residual stress of the prepared cellulose ester film is relaxed, and the dimensional change, the optical characteristic change, and the slow axis azimuth change, each under high temperature and under high temperature and high humidity, is reduced, which is thus preferable. The temperature at the time of heating is not particularly limited, but it is preferably from 100° C. to 200° C.

(Heated Water Vapor Treatment)

Further, the film which has been subjected to a stretching treatment may be prepared thereafter through a step for spraying water vapor which has been heated to 100° C. or higher. By passing it through this step for spraying water vapor, the residual stress of the prepared cellulose ester film is relaxed, and the dimensional change, the optical characteristic change, and the slow axis azimuth change, each under high temperature and under high temperature and high humidity, is reduced, which is thus preferable. The temperature of the water vapor is not particularly limited as long as it is 100° C. or higher, but the temperature of the water vapor is preferably 200° C. or lower taking into consideration the heat resistance of the film.

The step from casting to post-drying may be carried out in an air atmosphere or an inert gas atmosphere of a nitrogen gas or the like. As a winder which is used in the preparation of the cellulose ester film of the present invention, a generally used winder may be used, and the cellulose ester film can be wound up by a winding method, for example, a constant tension method, a constant torque method, a taper tension method, a program tension control method in which an internal stress is constant, and the like.

(Surface Treatment of Cellulose Ester Film)

It is preferable that the cellulose ester film is subjected to a surface treatment. Specific examples of such a method include a corona discharge treatment, a glow discharge treatment, a flame treatment, an acid treatment, an alkali treatment, and an ultraviolet ray irradiation treatment. Also, it is preferable to provide an undercoat layer as described in JP-A-7-333433.

It is preferred to regulate the temperature of the cellulose ester film in such a treatment to not higher than Tg (glass transition temperature), specifically not higher than 150° C. from the viewpoint of keeping planarity of the film.

In the case where the film is used as a transparent protective film of a polarizing plate, it is particularly preferable that the cellulose ester film is subjected to an acid treatment or an alkali treatment, that is, a saponification treatment for the cellulose ester from the viewpoint of adhesiveness to a polarizer.

The surface energy is preferably equal to or more than 55 mN/m, and more preferably equal to or more than 60 mN/m and equal to or less than 75 mN/m.

Hereinafter, the alkali saponification treatment is specifically described.

It is preferable that the alkali saponification treatment of the cellulose ester film is carried out in a cycle of dipping the film surface in an alkaline solution, neutralizing with an acidic solution, washing with water, and drying.

Examples of the alkaline solution include a potassium hydroxide solution and a sodium hydroxide solution. A hydroxyl ion concentration is preferably in the range from 0.1 to 3.0 moles/L, and more preferably in the range from 0.5 to 2.0 moles/L. The temperature of the alkaline solution is preferably in the range from room temperature to 90° C., and more preferably in the range from 40 to 70° C.

The surface energy of a solid can be determined by a contact angle method, a wet heat method or an adsorption method as described in "Basis and Application of Wetting" (published by Realize Inc, Dec. 10, 1989). In the case of the cellulose ester film of the present invention, it is preferable to adopt a contact angle method.

Specifically, two kinds of solutions each having known surface energy are dropped on the cellulose ester film, at a point of intersection at which the surface of the droplet and the film surface cross each other, an angle formed by a tangential line to the droplet and the film surface and including the droplet is defined as a contact angle, and the surface energy of the film can be calculated therefrom by means of calculation.

(Retardation of Film)

In the present specification, Re ($\lambda$) and Rth ($\lambda$) represent an in-plane retardation and a retardation in a thickness direction at a wavelength of $\lambda$, respectively. Re is measured by making light having a wavelength of $\lambda$ nm incident in a normal direction of the film in KOBRA 21ADH (manufactured by Oji Scientific Instruments). Rth is computed by KOBRA 21ADH on the basis of retardation values measured in three directions in total including the above-described Re, a retardation value measured by making light having a wavelength of $\lambda$ nm incident from an inclined direction at +40° against the normal direction of the film by forming an in-plane slow axis (determined by KOBRA 21ADH) as an axis of tilt (rotating axis) and a retardation value measured by making light having a wavelength of $\lambda$ nm incident from an inclined direction at −40° against the normal direction of the film by forming the in-plane slow axis as an axis of tilt (rotating axis). Here, as the hypothesized value of average refractive index, values described in Polymer Handbook (John Wiley & Sons, Inc.) and catalogues of various optical films can be employed. When a value of average refractive index is not known, it can be measured by an ABBE's refractometer. Values of average refractive index of major optical films are enumerated as follows: cellulose acylate (1.48), cycloolefin polymer (1.52), polycarbonate (1.59), polymethyl methacrylate (1.49), and polystyrene (1.59). By inputting such a hypothesized value of average refractive index and a thickness of the film, nx, ny and nz are computed by KOBRA 21ADH. Nz=(nx−nz)/(nx−ny) is further computed from the thus computed nx, ny and nz.

The cellulose ester film of the present invention is used as a protective film of a polarizing plate, and in particular, can also be preferably used as an optically compensatory corresponding to various liquid crystal modes. The optically compensatory films of the present invention include the cellulose ester film of the present invention.

In the case where the cellulose ester film of the present invention is used as an optically compensatory film, the Re measured at 590 nm is preferably from 30 to 200 nm, more preferably from 30 to 150 nm, and further preferably from 40 to 100 nm. Rth is preferably from 70 to 400 nm, more preferably from 100 to 300 nm, and further preferably from 100 to 250 nm.

More preferable optical characteristics of the cellulose ester film vary depending upon the liquid crystal mode.

For the VA mode, Re measured at 590 nm is preferably from 30 to 200 nm, more preferably from 30 to 150 nm, and further preferably from 40 to 100 nm. Rth is preferably from 70 to 400 nm, more preferably from 100 to 300 nm, and further preferably from 100 to 250 nm.

For the TN mode, Re measured at 590 nm is preferably from 0 to 100 nm, more preferably from 20 to 90 nm, and further preferably from 50 to 80 nm. Rth is preferably from 20 to 200 nm, more preferably from 30 to 150 nm, and further preferably from 40 to 120 nm.

For the TN mode, an optically anisotropic layer can be coated on the cellulose ester film having the above-described retardation value and used as an optically compensatory film.

(Slow Axis Azimuth of Film)

In the present invention, the slow axis azimuth of the film represents an angle defined by a direction giving a maximum refractive index in the film plane and a casting direction. The slow axis azimuth of the film can be measured with a birefringence retardation measurement device (AD-200 type, manufactured by Eto Co., Ltd). The slow axis azimuth for the optically compensatory film for VA, the width direction is preferably within 90°±1°, more preferably within 90°±0.5, further preferably within 90°±0.2°, and particularly preferably within 90°±0.1°, relative to the casting direction.

(Haze of Film)

The entire haze of the cellulose ester film of the present invention is preferably from 0.01 to 2.0%, more preferably from 0.05 to 1.5%, and further preferably from 0.1 to 1.0%. The internal haze is preferably from 0.01 to 0.5%, more preferably from 0.01 to 0.2%, and further preferably from 0.01 to 0.1%. Transparency of the film is important as an optical film. The haze of the film has a relationship with the contrast, and thus, the contrast can be increased by reducing the haze.

For measurement of haze, the entire haze (H), the internal haze (Hi), and the surface haze (HS) can be measured using a material of 40 mm×80 mm by the following measurement.

1) The entire haze (H) of the film is measured using a hazemeter NDH2000 (Nippon Denshoku Industries Co., Ltd.) in accordance with JIS K-7136.

2) Several drops of fluid paraffin are added to the surface and the backside of the film, two sheets of glass plates having a thickness of 1 mm (microslide glass product S9111, manufactured by Matsunami Glass Ind., Ltd.) are inserted forward and backward, completely, the two sheets of the glass plates and the resulting film are optically contacted with each other and the haze is measured in the state where the surface haze is removed. A value obtained by subtracting the resulting haze from a haze measured by inserting only fluid paraffin inserted between the two separately measured glass plates is calculated as an internal haze (Hi) of the film.

3) A value obtained by subtracting the internal haze (Hi) measured in the above 2) from the entire haze (H) measured in the above 1) is calculated as a surface haze (Hs) of the film.

(Spectral Characteristics and Spectral Transmittance)

A cellulose ester film sample of 13 mm×40 mm can be measured for transmittance at a wavelength of from 300 to 450 nm at 25° C. and 60% RH by using a spectrophotometer "U-3210" (manufactured by Hitachi, Ltd.). A tilt width can be determined by [(Wavelength of 72%)-(Wavelength of 5%)]. A threshold wavelength can be expressed by a wavelength of [(Tilt width)/2+5%], and an absorption edge can be expressed by a wavelength at a transmittance of 0.4%. According to this, the transmittances at 380 nm and 350 nm can be evaluated.

In the case where the cellulose ester film of the present invention is used on the opposing side of a protective film facing a liquid crystal cell of a polarizing plate, it is preferable that a spectral transmittance at a wavelength of 380 nm as measured by the above-described method is equal to or more than 45% and equal to or less than 95% and that and a spectral transmittance at a wavelength of 350 nm is equal to or less than 10%.

(Glass Transition Temperature)

A glass transition temperature of the cellulose ester film of the present invention is preferably 120° C. or higher, and more preferably 140° C. or higher.

The glass transition temperature can be determined as an average value between a temperature at which, when measured at a temperature rise rate of 10° C./min using a differential scanning calorimeter (DSC), a baseline starts to change deriving from glass transition of the film and a temperature at which the film again returns to the baseline.

Also, the glass transition temperature can be determined using the following dynamic viscoelasticity measuring apparatus. A cellulose ester film sample (unstretched) of 5 mm×30 mm) of the present invention is humidified at 25° C. and 60% RH for 2 hours or more and then measured using a dynamic viscoelasticity measurement device (VIBRON: DVA225, manufactured by IT Keisoku Seigyo Co., Ltd.) at a distance between grips of 20 mm, a temperature rise rate of 2° C./min, a measurement temperature range from 30° C. to 250° C. and a frequency of 1 Hz. When a storage modulus is plotted on the ordinate in terms of a logarithmic axis, and a temperature (° C.) is plotted on the abscissa in terms of a linear axis; an abrupt reduction of the storage modulus which is observed during transfer from a solid region to a glass transition region is drawn as a straight line 1 in the solid region and drawn as a straight line 2 in the glass transition region; and a point of intersection between the straight line 1 and the straight line 2 is a temperature at which the storage modulus abruptly reduces at the time of temperature rise, and the film starts to become soft and is a temperature at which the film starts to transfer into the glass transition region. Thus, this temperature is defined as a glass transition temperature Tg (dynamic viscoelasticity).

(Equilibrium Moisture Content of Film)

With respect to an equilibrium moisture content of the cellulose ester film of the present invention, when the cellulose ester film is used as a protective film of a polarizing plate, for the purpose of not impairing the adhesiveness to a water-soluble polymer such as polyvinyl alcohol, the equilibrium moisture content at 25° C. and 80% RH is preferably from 0 to 4%, more preferably from 0.1 to 3.5%, and particularly preferably from 1 to 3% regardless of the film thickness. When the equilibrium moisture content is not more than 4% this is preferable because when used as a support of an optically compensatory film, the dependency of the retardation due to a humidity change does not become excessively large.

The moisture content was measured with respect to a cellulose ester film sample of 7 mm×35 mm of the present invention using a moisture measuring system and a sample dryer, "CA-03" and "VA-05" (both of which are manufactured by Mitsubishi Chemical Corporation) by the Karl Fischer's method. The equilibrium moisture content was calculated by dividing the water content (g) by the sample mass (g).

(Water Vapor Permeability of Film)

A water vapor permeability of the film is measured under the condition at 60° C. and 95% RH in accordance with JIS Z-0208.

When the thickness of the cellulose ester film is thick, the water vapor permeability is small, whereas when it is thin, the water vapor permeability is large. In samples having a different film thickness from each other, it is necessary to convert the film thickness while providing a basis at 80 μm. The conversion of the film thickness can be performed according to the following numerical expression.

Numerical Expression: Water vapor permeability converted at 80 μm=Measured water vapor permeability×Measured film thickness(μm)/80 (μm)

With respect to the measurement of the water vapor permeability, a method described in "Physical Properties II of Polymers" (Course 4 of Polymer Experiments, published by Kyoritsu Shuppan Co., Ltd.), pages 285 to 294, "Measurement of Vapor Permeation Amount (Mass Method, Thermometer Method, Vapor Pressure Method, and Adsorption Amount Method)" can be applied.

The water vapor permeability of the cellulose ester film of the present invention is preferably from 400 to 2000 g/m²·24 h, more preferably from 400 to 1800 g/m²·24 h, and particularly preferably from 400 to 1600 g/m²·24 h. When the water vapor permeability is not more than 2,000 g/m²·24 h this is preferable because inconvenience, for example, the matter that an absolute value of dependency of each of the Re value and the Rth value of the film on the humidity exceeds 0.5 nm/% RH, is not caused.

(Dimensional Change of Film)

With respect to the dimensional stability of the cellulose ester film of the present invention, it is preferable that all of a rate of dimensional change in the case of allowing the cellulose ester film to stand under the condition at 60° C. and 90% RH for 24 hours (at a high humidity) and a rate of dimensional change in the case of allowing the cellulose ester film to stand under the condition at 90° C. and 5% RH for 24 hours (at a high temperature) are preferably not more than 0.5%.

The rates are more preferably equal to or less than 0.3%, and further preferably equal to or less than 0.15%.

(Elastic Modulus of Film)

An elastic modulus of the cellulose ester film of the present invention is preferably from 200 to 500 kgf/mm², more preferably from 240 to 470 kgf/mm², and further preferably from 270 to 440 kgf/mm². As a specific measurement method, the elastic modulus was determined by measuring a stress at an elongation of 0.5% at a tensile rate of 10%/min in an atmosphere of 23° C. and 70% RH using a universal tension tester, "STM T50BP" manufactured by Toyo Baldwin Co., Ltd.

(Configuration of Cellulose Ester Film)

Though the cellulose ester film of the present invention may be of a single layer structure or may be configured of plural layers, it is preferably of a single layer structure. The film of a "single layer" structure as referred to herein means a single sheet of cellulose ester film but not a sheet prepared by adhering plural film materials. Also, a case where a single sheet of cellulose ester film is manufactured from plural cellulose ester solutions by a sequential casting mode or a co-casting mode is also included.

In that case, the cellulose ester film having distribution in a thickness direction can be obtained by properly adjusting the kind and blending amount of an additive, the molecular weight distribution of the cellulose ester, the kind of the cellulose ester and the like. Also, there is included a single sheet of film having various functional sections such as an optically anisotropic section, an antiglare section, a gas barrier section, a moisture resistant section, and the like.

<<Optically Compensatory Film>>

The cellulose ester film of the present invention can be used as an optically compensatory. Further, the "optically compensatory film" means an optical material with optical anisotropy, which is generally used in a display device such as liquid crystal display devices, and is synonymous with a retardation plate, a retardation film, an optically compensatory sheet, and the like. In a liquid crystal display device, the optically compensatory film is used for the purposes of enhancing the contrast of a display image and improving the viewing angle characteristic or tint.

By using the transparent cellulose ester film of the present invention, it is possible to easily prepare an optically compensatory film with freely controlled Re value and Rth value.

Also, a film prepared by stacking plural sheets of the cellulose ester film of the present invention or stacking the cellulose ester film of the present invention with a film falling outside the scope of the present invention to properly adjust Re and Rth can be used as the optically compensatory film. Stacking of films can be carried out using an adhering agent or an adhesive.

Further, according to circumstances, the cellulose ester film of the present invention can be used as an optically compensatory film by using it as a support of an optically compensatory film and providing thereon an optically anisotropic layer composed of a liquid crystal and the like. The optically anisotropic layer which is applied for the optically compensatory film of the present invention may be made of a composition containing, for example, a crystalline compound, may be made of a cellulose ester film with birefringence, or may be made of the cellulose ester film of the present invention.

As the above-described liquid crystalline compound, a discotic liquid crystalline compound or a rod-shaped liquid crystalline compound is preferable.

(Discotic Liquid Crystalline Compound)

Examples of the discotic liquid crystalline compound which can be used as the liquid crystalline compound in the present invention include compounds described in various documents (for example, C. Destrade, et al., Mol. Crysr. Liq, Cryst., Vol, 71, page 111 (1981); Quarterly Review of Chemistry, No. 22, Chemistry of Liquid Crystal, Chapter 5 and Chapter 10, Section 2 (1994), edited by The Chemical Society of Japan; B. Kohne et al., Angew. Chem. Soc. Chem. Comm., page 1794 (1985); and J. Zhang et al., J. Am. Chem, Soc., Vol. 116, page 2655 (1994)).

In the optically compensatory layer, the discotic liquid crystalline molecule is preferably fixed in an aligned state, and most preferably fixed through a polymerization reaction. Also, the polymerization of the discotic liquid crystalline molecule is disclosed in JP-A-8-27284. In order to fix the discotic liquid crystalline molecule through polymerization, it is necessary that a polymerizable group is bound as a substituent to a disc-shaped core of the discotic liquid crystalline molecule. However, when the polymerizable group is bound directly to the disc-shaped core, it is difficult to keep the aligned state in the polymerization reaction. Then, a connecting group is introduced between the disc-shaped core and the polymerizable group. The polymerizable group-containing discotic liquid crystalline molecule is disclosed in JP-A-2001-4387.

<<Polarizing Plate>>

The cellulose ester film or optically compensatory film of the present invention can be used as a protective film of a polarizing plate (the polarizing plate of the present invention). The polarizing plate of the present invention is a polarizing plate composed of a polarizer and two protective films adhered on both sides of the polarizing plate, in which at least one of the protective films is the optically compensatory film of the present invention.

In the case where the cellulose ester film of the present invention is used as the polarizing plate protective film, it is preferable that the cellulose ester film of the present invention is hydrophilized upon being subjected to the above-described surface treatment (also described in JP-A-6-94915 and JP-A-6-118232). It is preferable that the cellulose ester film of the present invention is subjected to, for example, a glow discharge treatment, a corona discharge treatment, an alkali saponification treatment, and the like. In particular, in the case where the cellulose ester constituting the cellulose ester film of the present invention is a cellulose acylate, an alkali saponification treatment is most preferably employed as the above-described surface treatment.

Further, as the polarizer, for example, a polarizer which is prepared by dipping a polyvinyl alcohol film in an iodine solution and stretching it can be used. In the case of using a polarizer prepared by dipping a polyvinyl alcohol film in an iodine solution and stretching it, the surface-treated surface of the transparent cellulose ester film of the present invention can be directly adhered on both surfaces of the polarizer using an adhesive. In the preparation method of the present invention, it is preferable that the cellulose ester film is directly adhered to the polarizer in such way. As the adhesive, an aqueous solution of polyvinyl alcohol or a polyvinyl acetal (for example, polyvinyl butyral) or a latex of a vinyl based polymer (for example, polybutyl acrylate) can be used. The adhesive is particularly preferably an aqueous solution of completely saponified polyvinyl alcohol.

In general, since a liquid crystal display device is provided with a liquid crystal cell between two polarizing plates, it has four polarizing plate protective films. The cellulose ester film of the present invention may be used in any of the four polarizing plate protective films. However, the cellulose ester film of the present invention is especially advantageously used as a protective film to be disposed between the polarizer and the liquid crystal layer (liquid crystal cell) in the liquid crystal display device. Also, for the protective film to be disposed on the opposing side of the cellulose ester film of the present invention relative to the polarizer, a transparent hard coat layer, an antiglare layer, an antireflection layer, or the like can be provided. In particular, the cellulose ester film of the present invention is preferably used as a polarizing plate protective film of the outermost surface on the display side of the liquid crystal display device.

<<Liquid Crystal Display Device>>

The cellulose ester film, optically compensatory film, and polarizing plate of the present invention can be used in liquid crystal display devices of various display modes. The liquid crystal display device of the present invention includes the polarizing plate of the present invention. Each of the liquid crystal modes for which these films are used is hereunder described. Of these modes, the cellulose ester film, optically compensatory film and polarizing plate of the present invention are particularly preferably used in liquid crystal display devices of a VA mode and an IPS mode. These liquid crystal display devices may be used in any of a transmission type, a reflection type, and a semi-transmission type.

(VA Type Liquid Crystal Display Device)

The cellulose ester film of the present invention is especially advantageously used as an optically compensatory film of a VA type liquid crystal display device having a liquid crystal cell of a VA mode or a support of an optically compensatory film. The VA type liquid crystal display device may be an aligned and divided mode disclosed in, for example, JP-A-10-123576. In such embodiments, the polarizing plate using the cellulose ester film of the present invention contributes to an enlargement of the viewing angle and an improvement of the contrast.

EXAMPLES

Hereinafter, the present invention is specifically described with reference to the following Examples, but it should not be construed that the present invention is limited thereto.

Polycondensates P-1 to P-19, P-43, and P-44 and Comparative polycondensates 1 to 14, which were used in Examples and Comparative Examples, are shown in Table 2 and Table 3.

TABLE 2

| | Aromatic dicarboxylic acid residue | Aliphatic dicarboxylic acid residue | Ratio of dicarboxylic acid residues (mol %) | Ratio of aromatic dicarboxylic acid residues (mol %) | Average carbon number of aliphatic dicarboxylic acid residue | Aliphatic diol residue | Ratio of diol residues (mol %) | Average carbon number of aliphatic diol residues | Both terminals | Number average molecular weight |
|---|---|---|---|---|---|---|---|---|---|---|
| P-1 | TPA/PA | SA/AA | 45/5/30/20 | 50 | 4.8 | Ethylene glycol | 100 | 2.0 | Acetyl ester residue | 700 |
| P-2 | TPA/PA | SA/AA | 45/5/30/20 | 50 | 4.8 | Ethylene glycol | 100 | 2.0 | Acetyl ester residue | 900 |
| P-3 | TPA/PA | SA/AA | 45/5/30/20 | 50 | 4.8 | Ethylene glycol | 100 | 2.0 | Acetyl ester residue | 1000 |
| P-4 | TPA/PA | SA/AA | 45/5/30/20 | 50 | 4.8 | Ethylene glycol | 100 | 2.0 | Acetyl ester residue | 1250 |
| P-5 | TPA/PA | SA/AA | 45/5/30/20 | 50 | 4.8 | Ethylene glycol | 100 | 2.0 | Acetyl ester residue | 1800 |
| P-6 | TPA/PA | SA/AA | 45/5/30/20 | 50 | 4.8 | Ethylene glycol | 100 | 2.0 | Acetyl ester residue | 2500 |
| P-7 | TPA/PA | SA/AA | 45/5/25/25 | 50 | 5.0 | Ethylene glycol | 100 | 2.0 | Acetyl ester residue | 1000 |
| P-8 | TPA/PA | SA/AA | 45/5/35/15 | 50 | 4.6 | Ethylene glycol | 100 | 2.0 | Acetyl ester residue | 1000 |
| P-9 | TPA/PA | SA/AA | 45/5/40/10 | 50 | 4.4 | Ethylene glycol | 100 | 2.0 | Acetyl ester residue | 1000 |
| P-10 | TPA/PA | SA | 45/5/50 | 50 | 4.0 | Ethylene glycol | 100 | 2.0 | Acetyl ester residue | 1000 |
| P-11 | TPA | SA | 40/60 | 40 | 4.0 | Ethylene glycol | 100 | 2.0 | Acetyl ester residue | 1000 |
| P-12 | TPA | SA | 50/50 | 50 | 4.0 | Ethylene glycol | 100 | 2.0 | Acetyl ester residue | 1000 |
| P-13 | TPA | SA | 60/40 | 60 | 4.0 | Ethylene glycol | 100 | 2.0 | Acetyl ester residue | 1000 |
| P-14 | TPA | SA | 70/30 | 70 | 4.0 | Ethylene glycol | 100 | 2.0 | Acetyl ester residue | 1000 |
| P-15 | TPA | SA | 60/40 | 60 | 4.0 | Ethylene glycol/1,2-propanediol | 50/50 | 2.5 | Acetyl ester residue | 1000 |
| P-16 | TPA | SA | 60/40 | 60 | 4.0 | 1,2-propanediol | 100 | 3.0 | Acetyl ester residue | 1000 |
| P-17 | TPA | SA | 50/50 | 50 | 4.0 | Ethylene glycol | 100 | 2.0 | Acetyl ester residue | 1250 |
| P-18 | TPA | SA | 50/50 | 50 | 4.0 | Ethylene glycol | 100 | 2.0 | Diol residue | 1250 |
| P-19 | TPA | SA | 50/50 | 50 | 4.0 | Ethylene glycol | 100 | 2.0 | Benzoyl ester residue | 1250 |
| P-43 | TPA/PA | SA/AA | 45/5/30/20 | 50 | 4.8 | Ethylene glycol | 100 | 2.0 | Acetyl ester residue | 800 |
| P-44 | TPA/PA | SA/AA | 45/5/30/20 | 50 | 4.8 | Ethylene glycol | 100 | 2.0 | Acetyl ester residue | 2700 |

*1) PA: phthalic acid, TPA: terephthalic acid, SA: succinic acid, AA: adipic acid

TABLE 3

| | Aromatic dicarboxylic acid residue | Aliphatic dicarboxylic acid residue | Ratio of dicarboxylic acid residues (mol %) | Ratio of aromatic dicarboxylic acid residues (mol %) | Average carbon number of aliphatic dicarboxylic acid residue |
|---|---|---|---|---|---|
| Comparative polycondensate 1 | — | SA | 100 | 0 | 4.0 |
| Comparative polycondensate 2 *2) | — | SA | 100 | 0 | 4.0 |
| Comparative polycondensate 3 | — | AA | 100 | 0 | 6.0 |
| Comparative polycondensate 4 *3) | — | AA | 100 | 0 | 6.0 |
| Comparative polycondensate 5 | TPA | SA | 5/95 | 5 | 4.0 |
| Comparative polycondensate 6 *4) | TPA | SA | 5/95 | 5 | 4.0 |
| Comparative polycondensate 7 *5) | PA | — | 100 | 100 | — |
| Comparative polycondensate 8 *6) | PA | — | 100 | 100 | — |
| Comparative polycondensate 9 | TPA/PA | AA | 45/5/50 | 50 | 6.0 |
| Comparative polycondensate 10 | TPA/PA | SA/AA | 45/5/30/20 | 50 | 4.8 |
| Comparative polycondensate 11 | TPA/PA | SA/AA | 45/5/30/20 | 50 | 4.8 |
| Comparative polycondensate 12 | — | SA | 100 | 0 | 4.0 |
| Comparative polycondensate 13 | TPA | SA | 5/95 | 5 | 4.0 |
| Comparative polycondensate 14 | TPA/PA | SA/AA | 45/5/15/35 | 50 | 5.4 |

TABLE 3-continued

|  | Aliphatic diol residue | Ratio of diol residues (mol %) | Average carbon number of aliphatic diol residues | Both terminals | Number average molecular weight |
|---|---|---|---|---|---|
| Comparative polycondensate 1 | Ethylene glycol | 100 | 2.0 | Diol residue | 1250 |
| Comparative polycondensate 2 *2) | Ethylene glycol | 100 | 2.0 | Diol residue | 2000 |
| Comparative polycondensate 3 | Ethylene glycol | 100 | 2.0 | Acetyl ester residue | 1000 |
| Comparative polycondensate 4 *3) | 1,2-Propanediol | 100 | 3.0 | Benzoyl ester residue | 900 |
| Comparative polycondensate 5 | Ethylene glycol | 100 | 2.0 | Diol residue | 1250 |
| Comparative polycondensate 6 *4) | Ethylene glycol | 100 | 2.0 | Diol residue | 3000 |
| Comparative polycondensate 7 *5) | 1,2-Propanediol | 100 | 3.0 | Benzoyl ester residue | 700 |
| Comparative polycondensate 8 *6) | 1,3-Butanediol | 100 | 4.0 | Acetyl ester residue | 900 |
| Comparative polycondensate 9 | Ethylene glycol | 100 | 2.0 | Acetyl ester residue | 1000 |
| Comparative polycondensate 10 | 1,4-Butanediol | 100 | 4.0 | Acetyl ester residue | 1000 |
| Comparative polycondensate 11 | 1,6-Hexanediol | 100 | 6.0 | Acetyl ester residue | 1000 |
| Comparative polycondensate 12 | Ethylene glycol | 100 | 2.0 | Acetyl ester residue | 1000 |
| Comparative polycondensate 13 | Ethylene glycol | 100 | 2.0 | Acetyl ester residue | 1000 |
| Comparative polycondensate 14 | Ethylene glycol | 100 | 2.0 | Acetyl ester residue | 1000 |

*1) PA: phthalic acid, TPA: terephthalic acid, SA: succinic acid, AA: adipic acid
*2) Polyester polyol described in JP-A-2006-64803
*3) Aromatic terminal ester-based plasticizer described in WO 05/061595A1
*4) Polyester polyol described in JP-A-2006-64803
*5) Polyester plasticizer described in JP-A-2007-3767
*6) Phthalic acid-based polyester described in JP-A-61-276836

(Preparation of Dope)

As described in Table 16 to Table 17, the respective components of Examples 2, 4 to 21, 24, 25, 27, 29 to 46, 49, and 50, and Comparative Examples 1 to 27, the respective components of Examples 1 and 26, and the respective components of Examples 3 and 28 were sufficiently stirred under heating to the ratios of the following dope 1, the following dope 2, and the following dope 3, respectively, to dissolve the respective components, thereby preparing the dopes of each of Examples and Comparative Examples.

As described in Table 18, the respective components of Example 52, 54 to 71, 74, and 75, and Comparative Examples 28 to 39, the respective components of Example 51, and the respective components of Example 53 were sufficiently stirred under heating to the ratios of the following dope 4, the following dope 5, and the following dope 6, respectively, to dissolve the respective components, thereby preparing the dopes of each of Examples and Comparative Examples.

As described in Table 19, the respective components of Example 77, 79 to 96, 99, and 100, and Comparative Examples 40 to 54, the respective components of Example 76, and the respective components of Example 78 were sufficiently stirred under heating to the ratios of the following dope 7, the following dope 8, and the following dope 9, respectively, to dissolve the respective components, thereby preparing the dopes of each of Examples and Comparative Examples.

As described in Table 16 to Table 19, the respective components of Example 22, 47, 72, and 97 were sufficiently stirred under heating to the ratios of the following dope 10, to dissolve the respective components, thereby preparing the dopes of each of Examples and Comparative Examples.

As described in Table 16 to Table 19, the respective components of Example 23, 48, 73, and 98 were sufficiently stirred under heating to the ratios of the following dope 11, to dissolve the respective components, thereby preparing the dopes of each of Examples and Comparative Examples.

TABLE 4

(Dope 1)

| | |
|---|---|
| Cellulose acylate C-1 below | 100 parts by mass |
| Plasticizer or polycondensate | 11.3 parts by mass |
| Optical developing agent A below | 4.3 parts by mass |
| Silica particle having average particle diameter of 16 nm (AEROSIL R972 manufactured by Nippon Aerosil Co., Ltd.) | 0.16 part by mass |
| Dichloromethane | 429.3 parts by mass |
| Methanol | 64.2 parts by mass |

TABLE 5

(Dope 2)

| | |
|---|---|
| Cellulose acylate C-1 below | 100 parts by mass |
| Plasticizer or polycondensate | 7.0 parts by mass |
| Optical developing agent A below | 4.3 parts by mass |
| Silica particle having average particle diameter of 16 nm (AEROSIL R972 manufactured by Nippon Aerosil Co., Ltd.) | 0.16 part by mass |
| Dichloromethane | 413.4 parts by mass |
| Methanol | 61.8 parts by mass |

TABLE 6

(Dope 3)

| | |
|---|---|
| Cellulose acylate C-1 below | 100 parts by mass |
| Plasticizer or polycondensate | 15.0 parts by mass |
| Optical developing agent A below | 4.3 parts by mass |
| Silica particle having average particle diameter of 16 nm (AEROSIL R972 manufactured by Nippon Aerosil Co., Ltd.) | 0.16 part by mass |
| Dichloromethane | 443.1 parts by mass |
| Methanol | 66.2 parts by mass |

TABLE 7

(Dope 4)

| | |
|---|---|
| Cellulose acylate C-1 below | 100 parts by mass |
| Plasticizer or polycondensate | 11.3 parts by mass |
| Optical developing agent A below | 6.7 parts by mass |
| Silica particle having average particle diameter of 16 nm (AEROSIL R972 manufactured by Nippon Aerosil Co., Ltd.) | 0.16 part by mass |
| Dichloromethane | 438.2 parts by mass |
| Methanol | 65.5 parts by mass |

TABLE 8

(Dope 5)

| | |
|---|---|
| Cellulose acylate C-1 below | 100 parts by mass |
| Plasticizer or polycondensate | 7.0 parts by mass |
| Optical developing agent A below | 6.7 parts by mass |
| Silica particle having average particle diameter of 16 nm (AEROSIL R972 manufactured by Nippon Aerosil Co., Ltd.) | 0.16 part by mass |
| Dichloromethane | 423.3 parts by mass |
| Methanol | 63.1 parts by mass |

TABLE 9

(Dope 6)

| | |
|---|---|
| Cellulose acylate C-1 below | 100 parts by mass |
| Plasticizer or polycondensate | 15.0 parts by mass |
| Optical developing agent A below | 6.7 parts by mass |
| Silica particle having average particle diameter of 16 nm (AEROSIL R972 manufactured by Nippon Aerosil Co., Ltd.) | 0.16 part by mass |
| Dichloromethane | 452 parts by mass |
| Methanol | 67.5 parts by mass |

TABLE 10

(Dope 7)

| | |
|---|---|
| Cellulose acylate C-1 below | 100 parts by mass |
| Plasticizer or polycondensate | 11.3 parts by mass |
| Optical developing agent A below | 5.5 parts by mass |
| Silica particle having average particle diameter of 16 nm (AEROSIL R972 manufactured by Nippon Aerosil Co., Ltd.) | 0.16 part by mass |
| Dichloromethane | 433.8 parts by mass |
| Methanol | 64.8 parts by mass |

TABLE 11

(Dope 8)

| | |
|---|---|
| Cellulose acylate C-1 below | 100 parts by mass |
| Plasticizer or polycondensate | 7.0 parts by mass |
| Optical developing agent A below | 5.5 parts by mass |
| Silica particle having average particle diameter of 16 nm (AEROSIL R972 manufactured by Nippon Aerosil Co., Ltd.) | 0.16 part by mass |
| Dichloromethane | 417.9 parts by mass |
| Methanol | 62.4 parts by mass |

TABLE 12

(Dope 9)

| | |
|---|---|
| Cellulose acylate C-1 below | 100 parts by mass |
| Plasticizer or polycondensate | 15.0 parts by mass |
| Optical developing agent A below | 5.5 parts by mass |
| Silica particle having average particle diameter of 16 nm (AEROSIL R972 manufactured by Nippon Aerosil Co., Ltd.) | 0.16 part by mass |
| Dichloromethane | 447.5 parts by mass |
| Methanol | 66.9 parts by mass |

TABLE 13

(Dope 10)

| | |
|---|---|
| Cellulose acylate C-2 below | 100 parts by mass |
| Plasticizer or polycondensate | 18.5 parts by mass |
| Silica particle having average particle diameter of 16 nm (AEROSIL R972 manufactured by Nippon Aerosil Co., Ltd.) | 0.16 part by mass |
| Dichloromethane | 440.1 parts by mass |
| Methanol | 65.8 parts by mass |

TABLE 14

(Dope 11)

| | |
|---|---|
| Cellulose acylate C-3 below | 100 parts by mass |
| Plasticizer or polycondensate | 18.5 parts by mass |
| Silica particle having average particle diameter of 16 nm (AEROSIL R972 manufactured by Nippon Aerosil Co., Ltd.) | 0.16 part by mass |
| Dichloromethane | 440.1 parts by mass |
| Methanol | 65.8 parts by mass |

TABLE 15

| Cellulose acylate | Substituent/Substitution degree | Number average molecular weight |
|---|---|---|
| C-1 | Acetyl group/2.81 | 88000 |
| C-2 | Acetyl group/2.45 | 78000 |
| C-3 | Acetyl group/1.60 Propionyl group/0.9 | 80000 |

The number average molecular weight of the cellulose acylate described in Table 15 can be measured by means of GPC (Gel Permeation Chromatography). The above-described number average molecular weight was measured using a chloroform solution and polystyrene as a standard sample.

Optical developing agent A

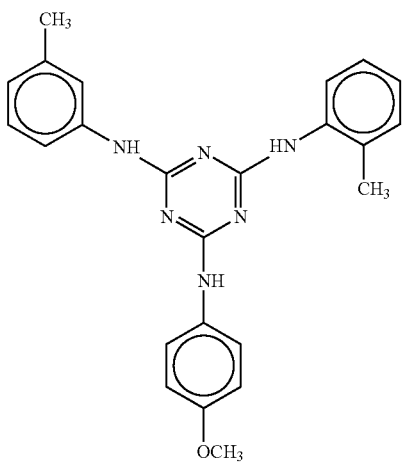

Examples 1 to 25 and Comparative Examples 1 to 15

The dope solutions of Examples 1 to 25 and Comparative Examples 1 to 15 were uniformly cast in a width of 2000 mm on a stainless steel band support using a band casting device. The solvent was evaporated by the stainless steel band support to such an extent that the residual solvent amount reached 40% by mass, and the film was peeled off from the stainless steel band support. Upon peeling, the film was stretched by applying a tension to a stretch ratio in the longitudinal direction (MD) of 1.02 times, and subsequently, while conveying the film after stretching, the film was conveyed in a drying zone at 130° C. for 20 minutes and then slit in a width of 1500 mm, thereby obtaining a cellulose acylate film having a film thickness of 70 μm.

Next, the resulting film was stretched in the width direction (transverse stretching) to a stretch ratio of 30% at a stretch rate of 60%/min using a tenter under the condition at 185° C. The film thickness of the finished cellulose acylate film was 54 μm.

TABLE 16

| | Cellulose ester | Optical developing agent *1) | Plasticizer or polycondensate *2) | Polycondensate | | |
|---|---|---|---|---|---|---|
| | | | | Ratio of aromatic dicarboxylic acid residues (mol %) | Ratio of aliphatic dicarboxylic acid residues (mol %) | Average carbon number of aliphatic diol residues |
| Example 1 | C-1 | A (4.3) | P-3 (3.0) | 50 | 4.8 | 2.0 |
| Example 2 | C-1 | A (4.3) | P-3 (11.3) | 50 | 4.8 | 2.0 |
| Example 3 | C-1 | A (4.3) | P-3 (15.0) | 50 | 4.8 | 2.0 |
| Example 4 | C-1 | A (4.3) | P-11 (11.3) | 40 | 4.0 | 2.0 |
| Example 5 | C-1 | A (4.3) | P-12 (11.3) | 50 | 4.0 | 2.0 |
| Example 6 | C-1 | A (4.3) | P-13 (11.3) | 60 | 4.0 | 2.0 |
| Example 7 | C-1 | A (4.3) | P-14 (11.3) | 70 | 4.0 | 2.0 |
| Example 8 | C-1 | A (4.3) | P-7 (11.3) | 50 | 5.0 | 2.0 |
| Example 9 | C-1 | A (4.3) | P-8 (11.3) | 50 | 4.6 | 2.0 |
| Example 10 | C-1 | A (4.3) | P-9 (11.3) | 50 | 4.4 | 2.0 |
| Example 11 | C-1 | A (4.3) | P-10 (11.3) | 50 | 4.0 | 2.0 |
| Example 12 | C-1 | A (4.3) | P-15 (11.3) | 60 | 4.0 | 2.5 |
| Example 13 | C-1 | A (4.3) | P-16 (11.3) | 60 | 4.0 | 3.0 |
| Example 14 | C-1 | A (4.3) | P-2 (11.3) | 50 | 4.8 | 2.0 |
| Example 15 | C-1 | A (4.3) | P-4 (11.3) | 50 | 4.8 | 2.0 |
| Example 16 | C-1 | A (4.3) | P-5 (11.3) | 50 | 4.8 | 2.0 |
| Example 17 | C-1 | A (4.3) | P-6 (11.3) | 50 | 4.8 | 2.0 |
| Example 18 | C-1 | A (4.3) | P-17 (11.3) | 50 | 4.0 | 2.0 |
| Example 19 | C-1 | A (4.3) | P-18 (11.3) | 50 | 4.0 | 2.0 |
| Example 20 | C-1 | A (4.3) | P-19 (11.3) | 50 | 4.0 | 2.0 |
| Example 21 | C-1 | A (4.3) | P-1 (11.3) | 50 | 4.8 | 2.0 |
| Example 22 | C-2 | — | P-3 (18.5) | 50 | 4.8 | 2.0 |
| Example 23 | C-3 | — | P-3 (18.5) | 50 | 4.8 | 2.0 |
| Example 24 | C-1 | A (4.3) | P-43 (11.3) | 50 | 4.8 | 2.0 |
| Example 25 | C-1 | A (4.3) | P-44 (11.3) | 50 | 4.8 | 2.0 |
| Comparative Example 1 | C-1 | A (4.3) | Triphenyl phosphate/ biphenyldiphenyl phosphate (6.6, 4.7) | | | |
| Comparative Example 2 | C-1 | A (4.3) | Comparative polycondensate 1 (11.3) | 0 | 4.0 | 2.0 |
| Comparative Example 3 | C-1 | A (4.3) | Comparative polycondensate 2 (11.3) | 0 | 4.0 | 2.0 |
| Comparative Example 4 | C-1 | A (4.3) | Comparative polycondensate 3 (11.3) | 0 | 6.0 | 2.0 |
| Comparative Example 5 | C-1 | A (4.3) | Comparative polycondensate 4 (11.3) | 0 | 6.0 | 3.0 |
| Comparative Example 6 | C-1 | A (4.3) | Comparative polycondensate 5 (11.3) | 5 | 4.0 | 2.0 |
| Comparative Example 7 | C-1 | A (4.3) | Comparative polycondensate 6 (11.3) | 5 | 4.0 | 2.0 |
| Comparative Example 8 | C-1 | A (4.3) | Comparative polycondensate 7 (11.3) | 100 | — | 3.0 |
| Comparative Example 9 | C-1 | A (4.3) | Comparative polycondensate 8 (11.3) | 100 | — | 4.0 |

TABLE 16-continued

| | | | | | | |
|---|---|---|---|---|---|---|
| Comparative Example 10 | C-1 | A (4.3) | Comparative polycondensate 9 (11.3) | 50 | 6.0 | 2.0 |
| Comparative Example 11 | C-1 | A (4.3) | Comparative polycondensate 10 (11.3) | 50 | 4.8 | 4.0 |
| Comparative Example 12 | C-1 | A (4.3) | Comparative polycondensate 11 (11.3) | 50 | 4.8 | 6.0 |
| Comparative Example 13 | C-1 | A (4.3) | Comparative polycondensate 12 (11.3) | 0 | 4.0 | 2.0 |
| Comparative Example 14 | C-1 | A (4.3) | Comparative polycondensate 13 (11.3) | 5 | 4.0 | 2.0 |
| Comparative Example 15 | C-1 | A (4.3) | Comparative polycondensate 14 (11.3) | 50 | 5.4 | 2.0 |

| | Polycondensate Both terminals | Number average molecular weight of polycondensate | Loss on heating of plasticizer or polycondensate | Bleed-out | Re [nm] | Rth [nm] |
|---|---|---|---|---|---|---|
| Example 1 | Acetyl ester residue | 1000 | ○ | ◎ | 47 | 141 |
| Example 2 | Acetyl ester residue | 1000 | ○ | ◎ | 44 | 127 |
| Example 3 | Acetyl ester residue | 1000 | ○ | ◎ | 42 | 118 |
| Example 4 | Acetyl ester residue | 1000 | ○ | ◎ | 42 | 122 |
| Example 5 | Acetyl ester residue | 1000 | ○ | ◎ | 46 | 132 |
| Example 6 | Acetyl ester residue | 1000 | ○ | ◎ | 50 | 142 |
| Example 7 | Acetyl ester residue | 1000 | ○ | ◎ | 55 | 147 |
| Example 8 | Acetyl ester residue | 1000 | ○ | ○ | 43 | 126 |
| Example 9 | Acetyl ester residue | 1000 | ○ | ◎ | 44 | 128 |
| Example 10 | Acetyl ester residue | 1000 | ○ | ◎ | 45 | 128 |
| Example 11 | Acetyl ester residue | 1000 | ○ | ◎ | 46 | 129 |
| Example 12 | Acetyl ester residue | 1000 | ○ | ◎ | 41 | 119 |
| Example 13 | Acetyl ester residue | 1000 | ○ | ○ | 40 | 119 |
| Example 14 | Acetyl ester residue | 900 | ○ | ◎ | 44 | 128 |
| Example 15 | Acetyl ester residue | 1250 | ○ | ◎ | 46 | 131 |
| Example 16 | Acetyl ester residue | 1800 | ○ | ○ | 47 | 134 |
| Example 17 | Acetyl ester residue | 2500 | ◎ | ○△ | 49 | 138 |
| Example 18 | Acetyl ester residue | 1250 | ○ | ◎ | 44 | 119 |
| Example 19 | Diol residue | 1250 | ◎ | ◎ | 46 | 122 |
| Example 20 | Benzoyl ester residue | 1250 | △ | ○ | 43 | 139 |
| Example 21 | Acetyl ester residue | 700 | △ | ◎ | 45 | 128 |
| Example 22 | Acetyl ester residue | 1000 | ○ | ◎ | 65 | 125 |
| Example 23 | Acetyl ester residue | 1000 | ○ | ◎ | 40 | 122 |
| Example 24 | Acetyl ester residue | 800 | ○△ | ◎ | 44 | 125 |
| Example 25 | Acetyl ester residue | 2700 | ◎ | △ | 49 | 140 |
| Comparative Example 1 | — | | X | ◎ | 40 | 117 |
| Comparative Example 2 | Diol residue | 1250 | ○ | ◎ | 27 | 82 |
| Comparative Example 3 | Diol residue | 2000 | ◎ | △ | 25 | 87 |
| Comparative Example 4 | Acetyl ester residue | 1000 | ○ | X | 23 | 73 |
| Comparative Example 5 | Benzoyl ester residue | 900 | △ | X | 26 | 81 |
| Comparative Example 6 | Diol residue | 1250 | ○ | ◎ | 28 | 87 |
| Comparative Example 7 | Diol residue | 3000 | ◎ | X | 31 | 92 |
| Comparative Example 8 | Benzoyl ester residue | 700 | △ | X | 33 | 108 |
| Comparative Example 9 | Acetyl ester residue | 900 | ○ | X | 35 | 109 |
| Comparative Example 10 | Acetyl ester residue | 1000 | ○ | X | 41 | 121 |
| Comparative Example 11 | Acetyl ester residue | 1000 | ○ | △ | 44 | 122 |
| Comparative Example 12 | Acetyl ester residue | 1000 | △ | X | 39 | 119 |
| Comparative Example 13 | Acetyl ester residue | 1000 | ○ | ◎ | 24 | 78 |
| Comparative Example 14 | Acetyl ester residue | 1000 | ○ | ◎ | 25 | 84 |

TABLE 16-continued

| | | | | | | | |
|---|---|---|---|---|---|---|---|
| Comparative Example 15 | Acetyl ester residue | 1000 | ○ | | X | 43 | 123 |

*1) Addition amount of the optical developing agent based on 100 parts by mass of cellulose acylate in parenthesis (parts by mass)
*2) Addition amount of the plasticizer or polycondensate based on 100 parts by mass of cellulose acylate in parenthesis (parts by mass)

Examples 26 to 50 and Comparative Examples 16 to 27

The dope solutions of Examples 26 to 50 and Comparative Examples 16 to 27 were uniformly cast in a width of 2000 mm on a stainless steel band support using a band casting device. The solvent was evaporated by the stainless steel band support to such an extent that the residual solvent amount reached 40% by mass, and the film was peeled off from the stainless steel band support. Upon peeling, the film was stretched by applying a tension to a stretch ratio in the longitudinal direction (MD) of 1.02 times, and subsequently, both terminals were gripped by the tenter, and the film was stretched in the width direction (transverse stretching) to a stretch ratio in the width direction (TD) of 1.3 times at a stretch rate of 100%/min. At the time of starting stretching, the residual solvent amount was 30% by mass. After stretching, the film was conveyed while being dried in a drying zone at 130° C. for 20 minutes, and then slit in a width of 1500 mm, thereby obtaining a cellulose acylate film having a thickness of 54 μm.

TABLE 17

| | Cellulose ester | Optical developing agent *1) | Plasticizer or polycondensate *2) | Polycondensate | | |
|---|---|---|---|---|---|---|
| | | | | Ratio of aromatic dicarboxylic acid residues (mol %) | Ratio of aliphatic dicarboxylic acid residues | Average carbon number of aliphatic diol residues |
| Example 26 | C-1 | A (4.3) | P-3 (7.0) | 50 | 4.8 | 2.0 |
| Example 27 | C-1 | A (4.3) | P-3 (11.3) | 50 | 4.8 | 2.0 |
| Example 28 | C-1 | A (4.3) | P-3 (15.0) | 50 | 4.8 | 2.0 |
| Example 29 | C-1 | A (4.3) | P-11 (11.3) | 40 | 4.0 | 2.0 |
| Example 30 | C-1 | A (4.3) | P-12 (11.3) | 50 | 4.0 | 2.0 |
| Example 31 | C-1 | A (4.3) | P-13 (11.3) | 60 | 4.0 | 2.0 |
| Example 32 | C-1 | A (4.3) | P-14 (11.3) | 70 | 4.0 | 2.0 |
| Example 33 | C-1 | A (4.3) | P-7 (11.3) | 50 | 5.0 | 2.0 |
| Example 34 | C-1 | A (4.3) | P-8 (11.3) | 50 | 4.6 | 2.0 |
| Example 35 | C-1 | A (4.3) | P-9 (11.3) | 50 | 4.4 | 2.0 |
| Example 36 | C-1 | A (4.3) | P-10 (11.3) | 50 | 4.0 | 2.0 |
| Example 37 | C-1 | A (4.3) | P-15 (11.3) | 60 | 4.0 | 2.5 |
| Example 38 | C-1 | A (4.3) | P-16 (11.3) | 60 | 4.0 | 3.0 |
| Example 39 | C-1 | A (4.3) | P-2 (11.3) | 50 | 4.8 | 2.0 |
| Example 40 | C-1 | A (4.3) | P-4 (11.3) | 50 | 4.8 | 2.0 |
| Example 41 | C-1 | A (4.3) | P-5 (11.3) | 50 | 4.8 | 2.0 |
| Example 42 | C-1 | A (4.3) | P-6 (11.3) | 50 | 4.8 | 2.0 |
| Example 43 | C-1 | A (4.3) | P-17 (11.3) | 50 | 4.0 | 2.0 |
| Example 44 | C-1 | A (4.3) | P-18 (11.3) | 50 | 4.0 | 2.0 |
| Example 45 | C-1 | A (4.3) | P-19 (11.3) | 50 | 4.0 | 2.0 |
| Example 46 | C-1 | A (4.3) | P-1 (11.3) | 50 | 4.8 | 2.0 |
| Example 47 | C-2 | — | P-3 (18.5) | 50 | 4.8 | 2.0 |
| Example 48 | C-3 | — | P-3 (18.5) | 50 | 4.8 | 2.0 |
| Example 49 | C-1 | A (4.3) | P-43 (11.3) | 50 | 4.8 | 2.0 |
| Example 50 | C-1 | A (4.3) | P-44 (11.3) | 50 | 4.8 | 2.0 |
| Comparative Example 16 | C-1 | A (4.3) | Triphenyl phosphate/biphenyldiphenyl phosphate (6.6, 4.7) | | | |
| Comparative Example 17 | C-1 | A (4.3) | Comparative polycondensate 1 (11.3) | 0 | 4.0 | 2.0 |
| Comparative Example 18 | C-1 | A (4.3) | Comparative polycondensate 2 (11.3) | 0 | 4.0 | 2.0 |
| Comparative Example 19 | C-1 | A (4.3) | Comparative polycondensate 3 (11.3) | 0 | 6.0 | 2.0 |
| Comparative Example 20 | C-1 | A (4.3) | Comparative polycondensate 4 (11.3) | 0 | 6.0 | 3.0 |
| Comparative Example 21 | C-1 | A (4.3) | Comparative polycondensate 5 (11.3) | 5 | 4.0 | 2.0 |
| Comparative Example 22 | C-1 | A (4.3) | Comparative polycondensate 6 (11.3) | 5 | 4.0 | 2.0 |
| Comparative Example 23 | C-1 | A (4.3) | Comparative polycondensate 7 (11.3) | 100 | — | 3.0 |
| Comparative Example 24 | C-1 | A (4.3) | Comparative polycondensate 8 (11.3) | 100 | — | 4.0 |
| Comparative Example 25 | C-1 | A (4.3) | Comparative polycondensate 11 (11.3) | 50 | 4.8 | 6.0 |
| Comparative Example 26 | C-1 | A (4.3) | Comparative polycondensate 12 (11.3) | 0 | 4.0 | 2.0 |

TABLE 17-continued

| | | | | | | | | |
|---|---|---|---|---|---|---|---|---|
| Comparative Example 27 | C-1 | A (4.3) | Comparative polycondensate 13 (11.3) | 0 | 4.0 | | 2.0 | |

| | | Polycondensate | | | | |
|---|---|---|---|---|---|---|
| | Both terminals | Number average molecular weight of polycondensate | Loss on heating of plasticizer or polycondensate | Bleed-out | Re [nm] | Rth [nm] |
| Example 26 | Acetyl ester residue | 1000 | ○ | ◎ | 52 | 144 |
| Example 27 | Acetyl ester residue | 1000 | ○ | ◎ | 49 | 130 |
| Example 28 | Acetyl ester residue | 1000 | ○ | ◎ | 47 | 120 |
| Example 29 | Acetyl ester residue | 1000 | ○ | ◎ | 47 | 125 |
| Example 30 | Acetyl ester residue | 1000 | ○ | ◎ | 51 | 135 |
| Example 31 | Acetyl ester residue | 1000 | ○ | ◎ | 55 | 144 |
| Example 32 | Acetyl ester residue | 1000 | ○ | ◎ | 59 | 151 |
| Example 33 | Acetyl ester residue | 1000 | ○ | ◎ | 49 | 125 |
| Example 34 | Acetyl ester residue | 1000 | ○ | ◎ | 54 | 129 |
| Example 35 | Acetyl ester residue | 1000 | ○ | ◎ | 53 | 127 |
| Example 36 | Acetyl ester residue | 1000 | ○ | ◎ | 56 | 135 |
| Example 37 | Acetyl ester residue | 1000 | ○ | ◎ | 46 | 122 |
| Example 38 | Acetyl ester residue | 1000 | ○ | ◎ | 45 | 122 |
| Example 39 | Acetyl ester residue | 900 | ○ | ◎ | 49 | 131 |
| Example 40 | Acetyl ester residue | 1250 | ○ | ◎ | 51 | 134 |
| Example 41 | Acetyl ester residue | 1800 | ○ | ◎ | 52 | 137 |
| Example 42 | Acetyl ester residue | 2500 | ◎ | ◎ | 54 | 140 |
| Example 43 | Acetyl ester residue | 1250 | ○ | ◎ | 46 | 122 |
| Example 44 | Diol residue | 1250 | ◎ | ◎ | 51 | 125 |
| Example 45 | Benzoyl ester residue | 1250 | Δ | ◎ | 48 | 141 |
| Example 46 | Acetyl ester residue | 700 | Δ | ◎ | 50 | 131 |
| Example 47 | Acetyl ester residue | 1000 | ○ | ◎ | 69 | 128 |
| Example 48 | Acetyl ester residue | 1000 | ○ | ◎ | 45 | 125 |
| Example 49 | Acetyl ester residue | 800 | ○Δ | ◎ | 49 | 130 |
| Example 50 | Acetyl ester residue | 2700 | ◎ | ○ | 55 | 141 |
| Comparative Example 16 | — | | | ◎ | 45 | 120 |
| Comparative Example 17 | Diol residue | 1250 | ○ | ◎ | 32 | 87 |
| Comparative Example 18 | Diol residue | 2000 | ◎ | ◎ | 31 | 88 |
| Comparative Example 19 | Acetyl ester residue | 1000 | ○ | ◎ | 29 | 78 |
| Comparative Example 20 | Benzoyl ester residue | 900 | Δ | ○ | 30 | 81 |
| Comparative Example 21 | Diol residue | 1250 | ○ | ◎ | 34 | 92 |
| Comparative Example 22 | Diol residue | 3000 | ◎ | ○ | 36 | 93 |
| Comparative Example 23 | Benzoyl ester residue | 700 | Δ | X | 39 | 114 |
| Comparative Example 24 | Acetyl ester residue | 900 | ○ | X | 41 | 116 |
| Comparative Example 25 | Acetyl ester residue | 1000 | Δ | Δ | 43 | 119 |
| Comparative Example 26 | Acetyl ester residue | 1000 | ○ | ◎ | 27 | 78 |
| Comparative Example 27 | Acetyl ester residue | 1000 | ○ | ◎ | 29 | 86 |

*1) Addition amount of the optical developing agent based on 100 parts by mass of cellulose acylate in parenthesis (parts by mass)
*2) Addition amount of the plasticizer or polycondensate based on 100 parts by mass of cellulose acylate in parenthesis (parts by mass)

Examples 51 to 75 and Comparative Examples 28 to 39

The dope solutions of Examples 51 to 75 and Comparative Examples 28 to 39 were uniformly cast in a width of 2000 mm on a stainless steel band support using a band casting device. The solvent was evaporated by the stainless steel band support to such an extent that the residual solvent amount reached 40% by mass, and the film was peeled off from the stainless steel band support. Upon peeling, the film was stretched by applying a tension to a stretch ratio in the longitudinal direction (MD) of 1.02 times, and subsequently, both terminals were gripped by the tenter, and the film was stretched in the transverse direction (transverse stretching) to a stretch ratio in the width direction (TD) of 1.22 times at a stretch rate of 45%/min. At the time of starting stretching, the residual solvent amount was 30% by mass. After stretching, the film was conveyed while being dried in a drying zone at 130° C. for 35 minutes, and then slit in a width of 1500 mm, thereby obtaining a cellulose acylate film having a thickness of 82 μm.

TABLE 18

| | Cellulose ester | Optical developing agent *1) | Plasticizer or polycondensate *2) | Polycondensate Ratio of aromatic dicarboxylic acid residues (mol %) | Ratio of aliphatic dicarboxylic acid residues | Average carbon number of aliphatic diol residues |
|---|---|---|---|---|---|---|
| Example 51 | C-1 | A (6.7) | P-3 (7.0) | 50 | 4.8 | 2.0 |
| Example 52 | C-1 | A (6.7) | P-3 (11.3) | 50 | 4.8 | 2.0 |
| Example 53 | C-1 | A (6.7) | P-3 (15.0) | 50 | 4.8 | 2.0 |
| Example 54 | C-1 | A (6.7) | P-11 (11.3) | 40 | 4.0 | 2.0 |
| Example 55 | C-1 | A (5.7) | P-12 (11.3) | 50 | 4.0 | 2.0 |
| Example 56 | C-1 | A (6.7) | P-13 (11.3) | 60 | 4.0 | 2.0 |
| Example 57 | C-1 | A (6.7) | P-14 (11.3) | 70 | 4.0 | 2.0 |
| Example 58 | C-1 | A (6.7) | P-7 (11.3) | 50 | 5.0 | 2.0 |
| Example 59 | C-1 | A (6.7) | P-8 (11.3) | 50 | 4.6 | 2.0 |
| Example 60 | C-1 | A (6.7) | P-9 (11.3) | 50 | 4.4 | 2.0 |
| Example 61 | C-1 | A (6.7) | P-10 (11.3) | 50 | 4.0 | 2.0 |
| Example 62 | C-1 | A (6.7) | P-15 (11.3) | 60 | 4.0 | 2.5 |
| Example 63 | C-1 | A (6.7) | P-16 (11.3) | 60 | 4.0 | 3.0 |
| Example 64 | C-1 | A (6.7) | P-2 (11.3) | 50 | 4.8 | 2.0 |
| Example 65 | C-1 | A (6.7) | P-4 (11.3) | 50 | 4.8 | 2.0 |
| Example 66 | C-1 | A (6.7) | P-5 (11.3) | 50 | 4.8 | 2.0 |
| Example 67 | C-1 | A (6.7) | P-6 (11.3) | 50 | 4.8 | 2.0 |
| Example 68 | C-1 | A (6.7) | P-17 (11.3) | 50 | 4.0 | 2.0 |
| Example 69 | C-1 | A (6.7) | P-18 (11.3) | 50 | 4.0 | 2.0 |
| Example 70 | C-1 | A (6.7) | P-19 (11.3) | 50 | 4.0 | 2.0 |
| Example 71 | C-1 | A (6.7) | P-1 (11.3) | 50 | 4.8 | 2.0 |
| Example 72 | C-2 | — | P-3 (18.5) | 50 | 4.8 | 2.0 |
| Example 73 | C-3 | — | P-3 (18.5) | 50 | 4.8 | 2.0 |
| Example 74 | C-1 | A (6.7) | P-43 (11.3) | 50 | 4.8 | 2.0 |
| Example 75 | C-1 | A (6.7) | P-44 (11.3) | 50 | 4.8 | 2.0 |
| Comparative Example 28 | C-1 | A (6.7) | Triphenyl phosphate/biphenyldiphenyl phosphate (6.6, 4.7) | — | — | — |
| Comparative Example 29 | C-1 | A (6.7) | Comparative polycondensate 1 (11.3) | 0 | 4.0 | 2.0 |
| Comparative Example 30 | C-1 | A (6.7) | Comparative polycondensate 2 (11.3) | 0 | 4.0 | 2.0 |
| Comparative Example 31 | C-1 | A (6.7) | Comparative polycondensate 3 (11.3) | 0 | 6.0 | 2.0 |
| Comparative Example 32 | C-1 | A (6.7) | Comparative polycondensate 4 (11.3) | 0 | 6.0 | 3.0 |
| Comparative Example 33 | C-1 | A (6.7) | Comparative polycondensate 5 (11.3) | 5 | 4.0 | 2.0 |
| Comparative Example 34 | C-1 | A (6.7) | Comparative polycondensate 6 (11.3) | 5 | 4.0 | 2.0 |
| Comparative Example 35 | C-1 | A (6.7) | Comparative polycondensate 7 (11.3) | 100 | — | 3.0 |
| Comparative Example 36 | C-1 | A (6.7) | Comparative polycondensate 8 (11.3) | 100 | — | 4.0 |
| Comparative Example 37 | C-1 | A (6.7) | Comparative polycondensate 11 (11.3) | 50 | 4.8 | 6.0 |
| Comparative Example 38 | C-1 | A (6.7) | Comparative polycondensate 12 (11.3) | 0 | 4.0 | 2.0 |
| Comparative Example 39 | C-1 | A (6.7) | Comparative polycondensate 13 (11.3) | 5 | 4.0 | 2.0 |

| | Polycondensate Both terminals | Number average molecular weight of polycondensate | Loss on heating of plasticizer or polycondensate | Bleed-out | Re [nm] | Rth [nm] |
|---|---|---|---|---|---|---|
| Example 51 | Acetyl ester residue | 1000 | ○ | ◎ | 75 | 232 |
| Example 52 | Acetyl ester residue | 1000 | ○ | ◎ | 60 | 216 |
| Example 53 | Acetyl ester residue | 1000 | ○ | ◎ | 48 | 170 |
| Example 54 | Acetyl ester residue | 1000 | ○ | ◎ | 58 | 208 |
| Example 55 | Acetyl ester residue | 1000 | ○ | ◎ | 63 | 224 |
| Example 56 | Acetyl ester residue | 1000 | ○ | ◎ | 67 | 240 |
| Example 57 | Acetyl ester residue | 1000 | ○ | ◎ | 74 | 249 |
| Example 58 | Acetyl ester residue | 1000 | ○ | ◎ | 58 | 207 |
| Example 59 | Acetyl ester residue | 1000 | ○ | ◎ | 61 | 219 |
| Example 60 | Acetyl ester residue | 1000 | ○ | ◎ | 59 | 218 |
| Example 61 | Acetyl ester residue | 1000 | ○ | ◎ | 64 | 222 |
| Example 62 | Acetyl ester residue | 1000 | ○ | ◎ | 56 | 204 |
| Example 63 | Acetyl ester residue | 1000 | ○ | ◎ | 55 | 204 |
| Example 64 | Acetyl ester residue | 900 | ○ | ◎ | 60 | 218 |

TABLE 18-continued

| | | | | | | |
|---|---|---|---|---|---|---|
| Example 65 | Acetyl ester residue | 1250 | ○ | ◎ | 62 | 223 |
| Example 66 | Acetyl ester residue | 1800 | ○ | ◎ | 63 | 228 |
| Example 67 | Acetyl ester residue | 2500 | ◎ | ◎ | 65 | 234 |
| Example 68 | Acetyl ester residue | 1250 | ○ | ◎ | 56 | 201 |
| Example 69 | Diol residue | 1250 | ◎ | ◎ | 62 | 208 |
| Example 70 | Benzoyl ester residue | 1250 | Δ | ◎ | 58 | 235 |
| Example 71 | Acetyl ester residue | 700 | Δ | ◎ | 61 | 218 |
| Example 72 | Acetyl ester residue | 1000 | ○ | ◎ | 99 | 183 |
| Example 73 | Acetyl ester residue | 1000 | ○ | ◎ | 64 | 179 |
| Example 74 | Acetyl ester residue | 800 | ○Δ | ◎ | 60 | 215 |
| Example 75 | Acetyl ester residue | 2700 | ◎ | ○ | 66 | 236 |
| Comparative Example 28 | — | — | X | ◎ | 55 | 200 |
| Comparative Example 29 | Diol residue | 1250 | ○ | ◎ | 37 | 145 |
| Comparative Example 30 | Diol residue | 2000 | ◎ | ◎ | 38 | 149 |
| Comparative Example 31 | Acetyl ester residue | 1000 | ○ | ◎ | 32 | 130 |
| Comparative Example 32 | Benzoyl ester residue | 900 | Δ | ○ | 31 | 123 |
| Comparative Example 33 | Diol residue | 1250 | ○ | ◎ | 37 | 153 |
| Comparative Example 34 | Diol residue | 3000 | ◎ | ○ | 38 | 155 |
| Comparative Example 35 | Benzoyl ester residue | 700 | Δ | X | 43 | 172 |
| Comparative Example 36 | Acetyl ester residue | 900 | ○ | X | 42 | 177 |
| Comparative Example 37 | Acetyl ester residue | 1000 | Δ | Δ | 54 | 203 |
| Comparative Example 38 | Acetyl ester residue | 1000 | ○ | ◎ | 31 | 139 |
| Comparative Example 39 | Acetyl ester residue | 1000 | ○ | ◎ | 33 | 144 |

*1) Addition amount of the optical developing agent based on 100 parts by mass of cellulose acylate in parenthesis (parts by mass)
*2) Addition amount of the plasticizer or polycondensate based on 100 parts by mass of cellulose acylate in parenthesis (parts by mass)

Examples 76 to 100 and Comparative Examples 40 to 54

The dope solutions of Examples 76 to 100 and Comparative Examples 40 to 54 were uniformly cast in a width of 2000 mm on a stainless steel band support using a band casting device. The solvent was evaporated by the stainless steel band support to such an extent that the residual solvent amount reached 40% by mass, and the film was peeled off from the stainless steel band support. Upon peeling, the film was stretched by applying a tension to a stretch ratio in the longitudinal direction (MD) of 1.02 times, and subsequently, both terminals were gripped by the tenter, and the film was stretched in the width direction (transverse stretching) to a stretch ratio in the width direction (TD) of 1.3 times at a stretch rate of 100%/min. At the time of starting stretching, the residual solvent amount was 30% by mass. While the film was conveyed after stretching and dried at 130° C. for 20 minutes and then slit in a width of 1500 mm, thereby obtaining a cellulose acylate film having a thickness of 54 μm.

Next, the resulting film was stretched in the width direction (transverse stretching) using a tenter under the condition of 185° C. to a stretch ratio of 1.2 times at a stretch rate of 40%/min. The film thickness of the finished cellulose acylate film was 45 μm.

TABLE 19

| | Cellulose ester | Optical developing agent *1) | Plasticizer or polycondensate *2) | Polycondensate | | |
|---|---|---|---|---|---|---|
| | | | | Ratio of aromatic dicarboxylic acid residues (mol %) | Ratio of aliphatic dicarboxylic acid residues (mol %) | Average carbon number of aliphatic diol residues |
| Example 76 | C-1 | A (5.5) | P-3 (7.0) | 50 | 4.8 | 2.0 |
| Example 77 | C-1 | A (5.5) | P-3 (11.3) | 50 | 4.8 | 2.0 |
| Example 78 | C-1 | A (5.5) | P-3 (15.0) | 50 | 4.8 | 2.0 |
| Example 79 | C-1 | A (5.5) | P-11 (11.3) | 40 | 4.0 | 2.0 |
| Example 80 | C-1 | A (5.5) | P-12 (11.3) | 50 | 4.0 | 2.0 |
| Example 81 | C-1 | A (5.5) | P-13 (11.3) | 60 | 4.0 | 2.0 |
| Example 82 | C-1 | A (5.5) | P-14 (11.3) | 70 | 4.0 | 2.0 |
| Example 83 | C-1 | A (5.5) | P-7 (11.3) | 50 | 5.0 | 2.0 |
| Example 84 | C-1 | A (5.5) | P-8 (11.3) | 50 | 4.6 | 2.0 |
| Example 85 | C-1 | A (5.5) | P-9 (11.3) | 50 | 4.4 | 2.0 |
| Example 86 | C-1 | A (5.5) | P-10 (11.3) | 50 | 4.0 | 2.0 |

TABLE 19-continued

| | | | | | | |
|---|---|---|---|---|---|---|
| Example 87 | C-1 | A (5.5) | P-15 (11.3) | 60 | 4.0 | 2.5 |
| Example 88 | C-1 | A (5.5) | P-16 (11.3) | 60 | 4.0 | 3.0 |
| Example 89 | C-1 | A (5.5) | P-2 (11.3) | 50 | 4.8 | 2.0 |
| Example 90 | C-1 | A (5.5) | P-4 (11.3) | 50 | 4.8 | 2.0 |
| Example 91 | C-1 | A (5.5) | P-5 (11.3) | 50 | 4.8 | 2.0 |
| Example 92 | C-1 | A (5.5) | P-6 (11.3) | 50 | 4.8 | 2.0 |
| Example 93 | C-1 | A (5.5) | P-17 (11.3) | 50 | 4.0 | 2.0 |
| Example 94 | C-1 | A (5.5) | P-18 (11.3) | 50 | 4.0 | 2.0 |
| Example 95 | C-1 | A (5.5) | P-19 (11.3) | 50 | 4.0 | 2.0 |
| Example 96 | C-1 | A (5.5) | P-1 (11.3) | 50 | 4.8 | 2.0 |
| Example 97 | C-2 | — | P-3 (18.5) | 50 | 4.8 | 2.0 |
| Example 98 | C-3 | — | P-3 (18.5) | 50 | 4.8 | 2.0 |
| Example 99 | C-1 | A (5.5) | P-43 (11.3) | 50 | 4.8 | 2.0 |
| Example 100 | C-1 | A (5.5) | P-44 (11.3) | 50 | 4.8 | 2.0 |
| Comparative Example 40 | C-1 | A (5.5) | Triphenyl phosphate/biphenyldiphenyl phosphate (6.6, 4.7) | | | |
| Comparative Example 41 | C-1 | A (5.5) | Comparative polycondensate 1 (11.3) | 0 | 4.0 | 2.0 |
| Comparative Example 42 | C-1 | A (5.5) | Comparative polycondensate 2 (11.3) | 0 | 4.0 | 2.0 |
| Comparative Example 43 | C-1 | A (5.5) | Comparative polycondensate 3 (11.3) | 0 | 6.0 | 2.0 |
| Comparative Example 44 | C-1 | A (5.5) | Comparative polycondensate 4 (11.3) | 0 | 6.0 | 3.0 |
| Comparative Example 45 | C-1 | A (5.5) | Comparative polycondensate 5 (11.3) | 5 | 4.0 | 2.0 |
| Comparative Example 46 | C-1 | A (5.5) | Comparative polycondensate 6 (11.3) | 5 | 4.0 | 2.0 |
| Comparative Example 47 | C-1 | A (5.5) | Comparative polycondensate 7 (11.3) | 100 | — | 3.0 |
| Comparative Example 48 | C-1 | A (5.5) | Comparative polycondensate 8 (11.3) | 100 | — | 4.0 |
| Comparative Example 49 | C-1 | A (5.5) | Comparative polycondensate 9 (11.3) | 50 | 6.0 | 2.0 |
| Comparative Example 50 | C-1 | A (5.5) | Comparative polycondensate 10 (11.3) | 50 | 4.8 | 4.0 |
| Comparative Example 51 | C-1 | A (5.5) | Comparative polycondensate 11 (11.3) | 50 | 4.8 | 6.0 |
| Comparative Example 52 | C-1 | A (5.5) | Comparative polycondensate 12 (11.3) | 0 | 4.0 | 2.0 |
| Comparative Example 53 | C-1 | A (5.5) | Comparative polycondensate 13 (11.3) | 5 | 4.0 | 2.0 |
| Comparative Example 54 | C-1 | A (5.5) | Comparative polycondensate 14 (11.3) | 50 | 5.4 | 2.0 |

| | Polycondensate | | | | |
|---|---|---|---|---|---|
| | Both terminals | Number average molecular weight of polycondensate | Loss on heating of plasticizer or polycondensate | Bleed-out | Re [nm] | Rth [nm] |
| Example 76 | Acetyl ester residue | 1000 | ○ | ◎ | 63 | 136 |
| Example 77 | Acetyl ester residue | 1000 | ○ | ◎ | 60 | 123 |
| Example 78 | Acetyl ester residue | 1000 | ○ | ◎ | 58 | 114 |
| Example 79 | Acetyl ester residue | 1000 | ○ | ◎ | 58 | 119 |
| Example 80 | Acetyl ester residue | 1000 | ○ | ◎ | 62 | 127 |
| Example 81 | Acetyl ester residue | 1000 | ○ | ◎ | 67 | 136 |
| Example 82 | Acetyl ester residue | 1000 | ○ | ◎ | 73 | 141 |
| Example 83 | Acetyl ester residue | 1000 | ○ | ○ | 58 | 119 |
| Example 84 | Acetyl ester residue | 1000 | ○ | ◎ | 59 | 121 |
| Example 85 | Acetyl ester residue | 1000 | ○ | ◎ | 61 | 125 |
| Example 86 | Acetyl ester residue | 1000 | ○ | ◎ | 62 | 126 |
| Example 87 | Acetyl ester residue | 1000 | ○ | ◎ | 56 | 117 |
| Example 88 | Acetyl ester residue | 1000 | ○ | ○ | 55 | 117 |
| Example 89 | Acetyl ester residue | 900 | ○ | ◎ | 59 | 124 |
| Example 90 | Acetyl ester residue | 1250 | ○ | ◎ | 62 | 127 |
| Example 91 | Acetyl ester residue | 1800 | ○ | ○ | 63 | 129 |
| Example 92 | Acetyl ester residue | 2500 | ◎ | ○Δ | 65 | 132 |
| Example 93 | Acetyl ester residue | 1250 | ○ | ◎ | 61 | 116 |
| Example 94 | Diol residue | 1250 | ◎ | ◎ | 62 | 119 |
| Example 95 | Benzoyl ester residue | 1250 | Δ | ○ | 58 | 133 |
| Example 96 | Acetyl ester residue | 700 | Δ | ◎ | 61 | 124 |
| Example 97 | Acetyl ester residue | 1000 | ○ | ◎ | 79 | 113 |
| Example 98 | Acetyl ester residue | 1000 | ○ | ◎ | 50 | 110 |
| Example 99 | Acetyl ester residue | 800 | ○Δ | ◎ | 58 | 120 |

TABLE 19-continued

| | | | | | | |
|---|---|---|---|---|---|---|
| Example 100 | Acetyl ester residue | 2700 | ◎ | Δ | 65 | 136 |
| Comparative Example 40 | — | — | X | ◎ | 55 | 115 |
| Comparative Example 41 | Diol residue | 1250 | ○ | ◎ | 40 | 86 |
| Comparative Example 42 | Diol residue | 2000 | ◎ | Δ | 42 | 85 |
| Comparative Example 43 | Acetyl ester residue | 1000 | ○ | X | 35 | 78 |
| Comparative Example 44 | Benzoyl ester residue | 900 | Δ | X | 36 | 80 |
| Comparative Example 45 | Diol residue | 1250 | ○ | ◎ | 41 | 94 |
| Comparative Example 46 | Diol residue | 3000 | ◎ | X | 43 | 95 |
| Comparative Example 47 | Benzoyl ester residue | 700 | Δ | X | 45 | 101 |
| Comparative Example 48 | Acetyl ester residue | 900 | ○ | X | 46 | 103 |
| Comparative Example 49 | Acetyl ester residue | 1000 | ○ | X | 56 | 118 |
| Comparative Example 50 | Acetyl ester residue | 1000 | ○ | Δ | 55 | 117 |
| Comparative Example 51 | Acetyl ester residue | 1000 | Δ | X | 54 | 115 |
| Comparative Example 52 | Acetyl ester residue | 1000 | ○ | ◎ | 39 | 83 |
| Comparative Example 53 | Acetyl ester residue | 1000 | ○ | ◎ | 40 | 91 |
| Comparative Example 54 | Acetyl ester residue | 1000 | ○ | X | 57 | 120 |

*1) Addition amount of the optical developing agent based on 100 parts by mass of cellulose acylate in parenthesis (parts by mass)
*2) Addition amount of the plasticizer or polycondensate based on 100 parts by mass of cellulose acylate in parenthesis (parts by mass)

Co-Casting Examples

Hereinafter, for the films prepared by simultaneous lamination co-casting, the present invention is specifically described with reference to Examples. However, it should not be construed that the present invention is limited to the following Examples.

(Preparation of Dope)

As described in Table 28, the respective components of Examples 101 to 105 were sufficiently stirred under heating to the ratios of the following dope 12 as a dope for an outer layer and the following dope 13 as a dope for an inner layer, and the respective components of Comparative Example 55 were sufficiently stirred under heating to the ratios of the following dope 16 as a dope for an outer layer and the following dope 17 as a dope for an inner layer, respectively, to dissolve the respective components, thereby preparing the dopes of each of the Examples and Comparative Examples.

As described in Table 29, the respective components of Examples 106 to 110 were sufficiently stirred under heating to the ratios of the following dope 14 as a dope for an outer layer and the following dope 15 as a dope for an inner layer, and the respective components of Comparative Example 56 were sufficiently stirred under heating to the ratios of the following dope 18 as a dope for an outer layer and the following dope 19 as a dope for an inner layer, respectively, to dissolve the respective components, thereby preparing the dopes of each of the Examples and Comparative Examples.

TABLE 20

(Dope 12)

| | |
|---|---|
| Cellulose acylate above C-1 | 100 parts by mass |
| Plasticizer or polycondensate | 9.0 parts by mass |

TABLE 20-continued (Dope 12)

| | |
|---|---|
| Optical developing agent above A | 3.8 parts by mass |
| Bluing dye having the structure below B | 0.000078 parts by mass |
| Silica particle having average particle diameter of 16 nm (AEROSIL R972 manufactured by Nippon Aerosil Co., Ltd.) | 0.14 parts by mass |
| Dichloromethane | 418.9 parts by mass |
| Methanol | 62.6 parts by mass |

TABLE 21

(Dope 13)

| | |
|---|---|
| Cellulose acylate above C-1 | 100 parts by mass |
| Plasticizer or polycondensate | 9.0 parts by mass |
| Optical developing agent above A | 3.8 parts by mass |
| Bluing dye having the structure below B | 0.000078 parts by mass |
| Dichloromethane | 418.4 parts by mass |
| Methanol | 62.5 parts by mass |

TABLE 22

(Dope 14)

| | |
|---|---|
| Cellulose acylate above C-1 | 100 parts by mass |
| Plasticizer or polycondensate | 9.0 parts by mass |
| Optical developing agent above A | 5.3 parts by mass |
| Bluing dye having the structure below B | 0.000078 parts by mass |
| Silica particle having average particle diameter of 16 nm (AEROSIL R972 manufactured by Nippon Aerosil Co., Ltd.) | 0.14 parts by mass |
| Dichloromethane | 424.5 parts by mass |
| Methanol | 63.4 parts by mass |

TABLE 23

(Dope 15)

| | |
|---|---|
| Cellulose acylate above C-1 | 100 parts by mass |
| Plasticizer or polycondensate | 9.0 parts by mass |
| Optical developing agent above A | 5.3 parts by mass |
| Bluing dye having the structure below B | 0.000078 parts by mass |
| Dichloromethane | 423.9 parts by mass |
| Methanol | 63.3 parts by mass |

TABLE 24

(Dope 16)

| | |
|---|---|
| Cellulose acylate above C-1 | 100 parts by mass |
| Plasticizer or polycondensate | 11.7 parts by mass |
| Optical developing agent above A | 4.3 parts by mass |
| Bluing dye having the structure below B | 0.000078 parts by mass |
| Silica particle having average particle diameter of 16 nm (AEROSIL R972 manufactured by Nippon Aerosil Co., Ltd.) | 0.14 parts by mass |
| Dichloromethane | 430.8 parts by mass |
| Methanol | 64.4 parts by mass |

TABLE 25

(Dope 17)

| | |
|---|---|
| Cellulose acylate above C-1 | 100 parts by mass |
| Plasticizer or polycondensate | 11.7 parts by mass |
| Optical developing agent above A | 4.3 parts by mass |
| Bluing dye having the structure below B | 0.000078 parts by mass |
| Dichloromethane | 430.2 parts by mass |
| Methanol | 64.3 parts by mass |

TABLE 26

(Dope 18)

| | |
|---|---|
| Cellulose acylate above C-1 | 100 parts by mass |
| Plasticizer or polycondensate | 11.7 parts by mass |
| Optical developing agent above A | 6.7 parts by mass |
| Bluing dye having the structure below B | 0.000078 parts by mass |
| Silica particle having average particle diameter of 16 nm (AEROSIL R972 manufactured by Nippon Aerosil Co., Ltd.) | 0.14 parts by mass |
| Dichloromethane | 439.7 parts by mass |
| Methanol | 65.7 parts by mass |

TABLE 27

(Dope 19)

| | |
|---|---|
| Cellulose acylate above C-1 | 100 parts by mass |
| Plasticizer or polycondensate | 11.7 parts by mass |
| Optical developing agent above A | 6.7 parts by mass |
| Bluing dye having the structure below B | 0.000078 parts by mass |
| Dichloromethane | 439.1 parts by mass |
| Methanol | 65.6 parts by mass |

Bluing Dye B

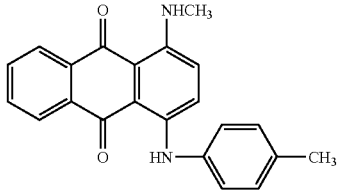

Examples 101 to 105 and Comparative Example 55

The dope solutions for the outer layers and the inner layers of Examples 101 to 105 and Comparative Examples 55 were subjected to uniform simultaneous lamination casting in a width of 2000 mm on a stainless steel band support using a band casting device, thereby obtaining a trilayer structure of an outer layer facing the support surface, an inner layer, and an outer layer facing the air intersurface. The solvent was evaporated by the stainless steel band support to such an extent that the residual solvent amount reached 40% by mass, and the film was peeled off from the stainless steel band support. Upon peeling, the film was stretched by applying a tension to a stretch ratio in the longitudinal direction (MD) of 1.02 times, and subsequently, both terminals were gripped by the tenter, and the film was stretched in the width direction (transverse stretching) to a stretch ratio in the width direction (TD) of 1.3 times at a stretch rate of 100%/min. At the time of starting stretching, the residual solvent amount was 30% by mass. After stretching, the films of Example 101 and Comparative Example 55 were conveyed while being dried in a drying zone at 115° C. for 20 minutes. At the time of starting stretching, the films of Example 102 and Example 105 were conveyed while being dried in a drying zone at 130° C. for 20 minutes. At the time of starting stretching, the film of Example 103 was conveyed while being dried in a drying zone at 135° C. for 20 minutes, and the film of Example 104 was conveyed while being dried in a drying zone at 140° C. for 20 minutes. After drying, the films were slit in a width of 1340 mm, thereby obtaining cellulose acylate films having a thickness of 54 μm and a film thickness ratio of the respective layers, the outer layer facing the support surface:the inner layer:the outer layer facing the air intersurface=3:94:3.

TABLE 28

| | Cellulose ester | Optical developing agent *1) | Plasticizer or polycondensate *2) | Loss on heating of plasticizer or polycondensate | Bleed-out | Re [nm] | Rth [nm] |
|---|---|---|---|---|---|---|---|
| Example 101 | C-1 | A (3.8) | P-3 (9.0) | ○ | ◎ | 46 | 123 |
| Example 102 | C-1 | A (3.8) | P-3 (9.0) | ○ | ◎ | 45 | 120 |
| Example 103 | C-1 | A (3.8) | P-3 (9.0) | ○ | ◎ | 44 | 119 |
| Example 104 | C-1 | A (3.8) | P-3 (9.0) | ○ | ◎ | 43 | 119 |
| Example 105 | C-1 | A (3.8) | P-15 (9.0) | ○ | ◎ | 45 | 121 |
| Comparative Example 55 | C-1 | A (4.3) | Triphenyl phosphate/ biphenyldiphenyl phosphate (6.8/4.9) | X | ◎ | 45 | 121 |

TABLE 28-continued

|  | Haze (%) | Internal haze (%) | Slow axis azimuth change of film | ΔRe [nm] (60° C. 90% 24 h) | ΔRth [nm] (60° C. 90% 24 h) | ΔRe [nm] (80% 24 h) | ΔRth [nm] (80% 24 h) |
|---|---|---|---|---|---|---|---|
| Example 101 | 0.28 | 0.04 | 0.48 | 2.8 | 9.4 | 0.8 | 3.7 |
| Example 102 | 0.35 | 0.05 | 0.18 | 2.5 | 8.0 | 0.5 | 1.6 |
| Example 103 | 0.36 | 0.05 | 0.09 | 2.4 | 7.6 | 0.5 | 1.3 |
| Example 104 | 0.35 | 0.06 | 0.02 | 2.1 | 6.0 | 0.4 | 1.0 |
| Example 105 | 0.37 | 0.06 | 0.16 | 2.2 | 7.0 | 0.5 | 1.3 |
| Comparative Example 55 | 0.56 | 0.15 | 0.54 | 2.4 | 8.2 | 0.6 | 2.4 |

*1) Addition amount of the optical developing agent based on 100 parts by mass of cellulose acylate in parenthesis (parts by mass)
*2) Addition amount of the plasticizer or polycondensate based on 100 parts by mass of cellulose acylate in parenthesis (parts by mass)

Examples 106 to 110 and Comparative Example 56

The dope solutions for the outer layers and the inner layers of Examples 106 to 110 and Comparative Examples 56 were subjected to uniform simultaneous lamination casting in a width of 2000 mm on a stainless steel band support using a band casting device, thereby obtaining a trilayer structure of an outer layer facing the support surface, an inner layer, and an outer layer facing the air intersurface. The solvent was evaporated by the stainless steel band support to such an extent that the residual solvent amount reached 40% by mass, and the film was peeled off from the stainless steel band support. Upon peeling, the film was stretched by applying a tension to a stretch ratio in the longitudinal direction (MD) of 1.02 times, and subsequently, both terminals were gripped by the tenter, and the film was stretched in the transverse direction (transverse stretching) to a stretch ratio in the width direction (TD) of 1.22 times at a stretch rate of 45%/min. At the time of starting stretching, the residual solvent amount was 30% by mass. After stretching, the films of Example 106 and Comparative Example 56 were conveyed while being dried in a drying zone at 115° C. for 35 minutes. At the time of starting stretching, the films of Example 107 and Example 110 were conveyed while being dried in a drying zone at 130° C. for 35 minutes. At the time of starting stretching, the film of Example 108 was conveyed while being dried in a drying zone at 135° C. for 35 minutes, and the film of Example 109 was conveyed while being dried in a drying zone at 140° C. for 35 minutes. After drying, the films were slit in a width of 1340 mm, thereby obtaining cellulose acylate films having a thickness of 82 μm and a film thickness ratio of the respective layers, the outer layer facing the support surface:the inner layer:the outer layer facing the air intersurface=3:94:3.

TABLE 29

|  | Cellulose ester | Optical developing agent *1 | Plasticizer or polycondensate *2 | Loss on heating of plasticizer or polycondensate | Bleed-out | Re [nm] | Rth [nm] |
|---|---|---|---|---|---|---|---|
| Example 106 | C-1 | A (5.3) | P-3 (9.0) | ○ | ◎ | 56 | 203 |
| Example 107 | C-1 | A (5.3) | P-3 (9.0) | ○ | ◎ | 56 | 202 |
| Example 108 | C-1 | A (5.3) | P-3 (9.0) | ○ | ◎ | 55 | 201 |
| Example 109 | C-1 | A (5.3) | P-3 (9.0) | ○ | ◎ | 54 | 201 |
| Example 110 | C-1 | A (5.3) | P-3 (9.0) | ○ | ◎ | 55 | 201 |
| Comparative Example 56 | C-1 | A (6.7) | Triphenyl phosphate/ biphenyldiphenyl phosphate (6.8/4.9) | X | ◎ | 54 | 200 |

|  | Haze (%) | Internal haze (%) | Slow axis azimuth change of film | ΔRe [nm] (60° C. 90% 24 h) | ΔRth [nm] (60° C. 90% 24 h) | ΔRe [nm] (80% 24 h) | ΔRth [nm] (80% 24 h) |
|---|---|---|---|---|---|---|---|
| Example 106 | 0.35 | 0.02 | 0.44 | 4.3 | 20.3 | 1.6 | 7.4 |
| Example 107 | 0.34 | 0.03 | 0.16 | 3.9 | 17.3 | 1.0 | 3.2 |
| Example 108 | 0.36 | 0.02 | 0.06 | 3.7 | 16.5 | 0.9 | 2.7 |
| Example 109 | 0.33 | 0.03 | 0.02 | 3.2 | 13.0 | 0.8 | 2.1 |
| Example 110 | 0.40 | 0.06 | 0.15 | 3.4 | 152 | 0.8 | 2.8 |
| Comparative Example 56 | 0.50 | 0.11 | 0.50 | 3.7 | 18.5 | 1.2 | 5.0 |

*1) Addition amount of the optical developing agent based on 100 parts by mass of cellulose acylate in parenthesis (parts by mass)
*2) Addition amount of the plasticizer or polycondensate based on 100 parts by mass of cellulose acylate in parenthesis (parts by mass)

(% Loss on Heating of Polycondensate or Plasticizer)

A loss on heating of the polycondensates and the low molecular weight plasticizers (triphenyl phosphate/biphenyl phosphate) used in Examples and Comparative Examples were measured by a thermobalance method. The temperature was raised from room temperature at a rate of 20° C./min and maintained for 10 minutes after reaching 140° C. After 60 minutes having passed since evaporation of the moisture contained, the loss on heating was measured and a loss of the mass was calculated. The loss rates of the masses of the polycondensate and the plasticizer were shown in Tables 16 to 19 and 28 to 29 according to the following evaluation criteria. As the values are higher, the compounds volatilize at the time of drying a cellulose ester web and thus process contamination is generated, which may be a cause of failure of the surface state in some cases.

⊚: Equal to or more than 0% and less than 0.25%
O: Equal to or more than 0.25% and less than 0.5%
OΔ: Equal to or more than 0.5% and less than 0.75%
Δ: Equal to or more than 0.75% and less than 1%
×: Equal to or more than 1%

(Bleed-Out (Failures of Surface State))

The obtained cellulose ester film sample was wound up in the roll shape, and this wound-up film was cut to a size of 100 mm×100 mm in the width direction at ten points, and the bleed-out was observed with the naked eyes. Thus, the average bleed-out degree of those of ten points was confirmed.

⊚: Bleed-out was not observed.
O: Bleed-out was observed at less than 5% of the film area.
OΔ: Bleed-out was observed at equal to or more than 5% and less than 20% of the film area.
Δ: Bleed-out was observed at equal to or more than 20% and less than 50% of the film area.
×: Bleed-out was observed at equal to or more than 50% of the film area.

(Measurement of Retardation)

Re and Rth were measured at a measurement wavelength of 590 nm under 25° C. and 60% RH using an automatic birefringence analyzer (KOBRA-21ADH, manufactured by Oji Scientific Instruments) by the above-described method. The measurements results are shown in Tables 16 to 19 and 28 to 29.

In the case of using a conventional low molecular weight plasticizer, Re and Rth can be adjusted to preferable values, but it was not sufficient in terms of a high loss on heating and failure of the surface state.

By the polycondensate according to the present invention, a cellulose ester film which has high Re and Rth and is suitable for an optically compensatory film can be obtained without interfering with its benefit through failure of the surface state.

(Measurement of Optical Characteristic Change Under High Temperature Environment Over Time)

The obtained film was adhered onto a glass plate using an adhesive and then Re and Rth were measured. Subsequently, after 24 hours have passed at 80° C., Re and Rth of the film were measured. The change amounts were calculated on the basis of Re and Rth of the film before having been left under an environment of a high temperature, which were each taken as ΔRe and ΔRth. These results are shown in Tables 28 to 29.

(Measurement of Optical Characteristic Change Caused From Time Passing Under Environment of High Temperature and High Humidity)

The obtained film was adhered onto a glass plate using an adhesive and then Re and Rth were measured. Subsequently, after 24 hours have passed at 60° C. and a relative humidity of 90%, Re and Rth were measured. The change amounts were calculated on the basis of Re and Rth of the film before having been left under an environment of a high temperature and a high humidity, which were each taken as ΔRe and ΔRth. These results are shown in Tables 28 to 29.

(Measurement of Slow Axis Azimuth Change of Film Caused From Time Passing Under Environment of High Temperature and High Humidity)

If a slow axis azimuth change of the film is caused under an environment of high temperature and high humidity in the process of a saponified polarizing plate, it becomes difficult to prepare a polarizing plate having preferable characteristics. Accordingly, the optically compensatory film is required to have a slow axis azimuth change of the film under an environment of high temperature and high humidity.

The film was sampled from a position at −500 mm in the film width direction and from a position at +500 mm in the film thickness width from a center of the film set at 0 mm, and the slow axis azimuth of the film was measured with a birefringence retardation measurement device (AD-200 type, manufactured by Eto Co., Ltd.). Thereafter, after 1 hour has passed at 80° C. and a relative humidity of 90%, the slow axis azimuth of the film was measured. The same sampling and measurement as the 2 places different in the casting direction positions were carried out.

For the films which were respectively sampled at −500 mm in the film width direction at three positions in the casting direction, a difference determined by subtracting of a slow axis azimuth before a time has passed under a thermal environment from a slow axis azimuth after a time has passed under a thermal environment, and similarly, for the film which was sampled at +500 mm in the film width direction, a difference determined by subtracting of a slow axis azimuth before a time has passed under a thermal environment from a slow axis azimuth after a time has passed under a thermal environment.

Next, at the respective three positions in the casting direction, the difference between a slow axis azimuth before a time has passed under a thermal environment and a slow axis azimuth after a time has passed under a thermal environment for the film which was sampled from a position at −500 mm in the film width direction was subtracted from the difference between a slow axis azimuth before a time has passed under a thermal environment and a slow axis azimuth after a time has passed under a thermal environment for the film which was sampled from a position at +500 mm in the film width direction, to give a value, which was taken as a slow axis azimuth change at a position in the casting direction of the respective styles.

In addition, an average in the slow axis changes in the three positions in the casting direction was calculated, and this absolute value was taken as a slow axis azimuth change of the film.

These results are shown in Tables 28 to 29.

The slow axis azimuth change of the film before and after 1 hour has passed under an environment of 80° C. and a relative humidity of 90% is equal to or less than 0.5°, more preferably equal to or less than 0.3°, further preferably equal to or less than 0.2°, and particularly preferably equal to or less than 0.1°.

The cellulose ester film containing the polycondensate of the present invention has a low loss on heating and is capable of reducing process contamination, and thus, it is difficult to generate bleed-out. Further, it is excellent as an optically compensatory film since it can provide the desired optical characteristics.

In the comparison of respective Examples 1 to 3, it can be found that the increase in the content of the polycondensate can lower a value of retardation and control the optical characteristics. Also, it can also be found that even the increase in the content of the polycondensate does not generate bleed-out and provides excellent surface state performance.

For Comparative Examples 2 to 5 and 13 in which the polycondensate has no aromatic dicarboxylic acid residue and has only aliphatic dicarboxylic acid residues, the films were not suitable as an optically compensatory film for VA in terms of optical characteristics.

In the comparison of Example 2 and Comparative Examples 10 and 15, the cellulose acylate film of Comparative Examples 10 and 15 in which the average carbon number of the aliphatic dicarboxylic acid residue is not within the range of the present invention had bleed-out, which was generated on the whole surface of the film in Comparative Example 10 and on 50% or more of the area of the film in Comparative Example 15.

In the comparison of Examples 18 to 20, it could be found that in Examples 18 and 19 in which the terminals are acetyl ester residues or diol residues (not sealed), the loss on heating was lower, as compared with Example 20 in which the terminals are benzoyl ester residues, and the polycondensate in which the terminals are diol residues or acetyl ester residues, volatilization hardly occurs.

Further, polycondensates P-17 to P-19, which were used respectively in Examples 18 to 20 had a wax form, a solid, and a wax form, respectively, as their states at a normal temperature. By sealing the terminals, the state at a normal temperature hardly becomes a solid form, and a polycondensate having good handleability could be obtained.

In the case that the ester derivative and the aliphatic diol, each having its terminal sealed, has an average carbon number of 3 equal to or less than, it is possible to remove low molecular weight components by pressure reduction or the like in the process for synthesizing a polycondensate. Accordingly, with such a structure, the compound has a loss on heating and it is possible to reduce process contamination.

Also in the preparation of a film using co-casting, by using the polycondensate of the present invention, a cellulose ester film which has low process contamination at the time of preparation, hardly generates bleed-out, has a high production efficiency and a good surface state, and thus have desired optical characteristics.

In the comparison of Examples 101 to 105 and Comparative Example 55, or in the comparison of Examples 106 to 110 and Comparative Example 56, the films of Examples 101 to 105 and Examples 106 to 110 in which the polycondensate of the present invention was used had the lower haze and internal haze, as compared with those of Comparative Example 55 and Comparative Example 56. The polycondensate of the present invention has high compatibility with cellulose acylate and hardly generates phase separation, and thus, bleed-out is hardly generated, and in addition, makes it possible to prepare a film having a low haze and a low internal haze.

In the comparison of Examples 101 to 104 or Examples 106 to 109, it is found that in Example 102 to 104, Example 107 to 109 in which the post-drying temperature after stretching was high has small slow axis azimuth change of the film and optical characteristic change ($\Delta Re$, $\Delta Rth$) between the values before and after a time has passed under an environment of high temperature, high temperature, and high humidity, as compared with Example 101 and Example 106 in which the post-drying temperature after stretching was 115° C.

By increasing the post-drying temperature, the residual stress of the cellulose ester film is relaxed, and the dimensional change, optical characteristics change and the slow axis azimuth change of the film become lower under high temperature and under high temperature and high humidity. For the polycondensate of the present invention, the loss on heating is low, process contamination is hardly generated, the post-drying condition of higher temperature can be chosen, and a film having high environmental stability can be continuously prepared.

(Preparation of Polarizing Plate)
1) Saponification of Film:

The obtained film and a commercially available cellulose triacetate film (FUJI TAC TD80UF, manufactured by Fujifilm Corporation) were dipped in an NaOH aqueous solution (saponification solution) of 1.5 moles/L kept at 55° C. for 2 minutes and then washed with water. Thereafter, the film was dipped in a sulfuric acid aqueous solution of 0.05 mole/L at 25° C. for 30 seconds, and further, the water washing bath was passed through running water for 30 seconds, thereby converting the film in a neutral state. Then, draining by an air knife was repeated three times, and after removing water, the film was retained and dried in a drying zone at 70° C. for 15 seconds, thereby preparing a saponified film.

2) Preparation of Polarizer

Iodine was adsorbed onto a stretched polyvinyl alcohol film according to Example 1 of JP-A-2001-141926, thereby preparing a polarizer having a thickness of 20 µm.

3) Adhering:

Using a polyvinyl alcohol-based adhesive, the obtained film was adhered on one side of the polarizer and a commercially available cellulose triacetate film was adhered on the other side of the polarizer, and dried at 70° C. for 10 minutes or longer. A polarizing plate was prepared using the film of Example 1 by the above-described method, which was designated as a polarizing plate 201. Polarizing plates 202 to 310 were prepared in the same manner using the films of Examples 2 to 110, respectively.

Example 226

Preparation of Polarizing Plate and Mounting Experiment on Liquid Crystal Displace Device of VA Mode (Preparation of Polarizing Plate)

The cellulose acylate film of Example 26 and a commercially available cellulose triacetate film (FUJI TAC TD80UF, manufactured by Fujifilm Corporation) were subjected to the same saponification treatment as described above. Furthermore, the polarizer above was sandwiched by two films using a polyvinyl alcohol-based adhesive, and dried at 70° C. for 10 minutes or longer to prepare a polarizing plate 226.

A transmission axis of the polarizer and a slow axis of the cellulose acylate film of Example 26 were disposed parallel to each other. The transmission axis of the polarizer and a slow axis of the commercially available cellulose triacetate film were disposed orthogonal to each other.

(Preparation of Liquid Crystal Cell)

A liquid crystal cell was prepared by regulating a cell gap between substrates at 3.6 µm and pouring dropwise a liquid crystal material with negative dielectric anisotropy (MLC6608, manufactured by Merck), followed by sealing to form a liquid crystal layer between the substrates. A retardation of the liquid crystal layer (namely, the product $\Delta n \cdot d$ of a thickness d (µm) of the liquid crystal layer and a refractive index anisotropy $\Delta n$) was regulated at 300 nm. The liquid crystal material was aligned so as to be vertically aligned.

(Mounting on VA Panel)

The polarizing plate 226 was provided with the cellulose acylate film on each of an upper side polarizing plate and a lower side polarizing plate (backlight side) of a liquid crystal display device using the above-described vertical alignment type liquid crystal cell such that the cellulose acylate film of Example 26 faced the liquid crystal cell side. The upper side polarizing plate and the lower side polarizing plate were adhered onto the liquid crystal cell using an adhesive. The upper side polarizing plate and the lower side polarizing plate were disposed under a crossed Nicols such that the transmission axis of the upper side polarizing plate was disposed in a vertical direction, whereas the transmission axis of the lower side polarizing plate was disposed in a horizontal direction.

A rectangular wave voltage of 55 Hz was applied to the liquid crystal cell. A normally black mode with a white display of 5 V and a black display of 0 V was employed. A transmittance (%) of black display in a viewing angle in a direction at an azimuth angle of black display of 45° and a polar angle of 60° and a color deviation between a spot at an azimuth angle of 45° and a polar angle 60° and a spot at an azimuth angle of 180° and a polar angle of 60° were determined.

Also, a transmittance ratio (white display/black display) was taken as a contrast ratio using a measuring device (EZ-Contrast 160D, manufactured by ELDIM Corporation), and a viewing angle (a polar angle range where no grayscale inversion took place on the black side at a contrast ratio of 10 or more) was measured on eight grades of from black display (L1) to white display (L8).

As a result of the observation of the prepared liquid crystal display device, a liquid crystal panel using the film of the present invention could realize neutral black display in any of the front direction and the viewing angle direction.

Further, the viewing angle (a polar angle range where no grayscale inversion took place on the black side at a contrast ratio of 10 or more) was 80° or more in the vertical and horizontal directions, and the color deviation at the time of black display was less than 0.02. Thus, good results were obtained.

Example 307

Preparation of Polarizing Plate and Mounting Experiment on Liquid Crystal Displace Device of VA Mode (Preparation of Polarizing Plate)

The cellulose acylate film of Example 107 and a commercially available cellulose triacetate film (FUJI TAC TD80UF, manufactured by Fujifilm Corporation) were subjected to the same saponification treatment as described above. Furthermore, the polarizer above was sandwiched by two films using a polyvinyl alcohol-based adhesive, and dried at 70° C. for 10 minutes or longer to prepare a polarizing plate 307.

A transmission axis of the polarizer and a slow axis of the cellulose acylate film of Example 107 were disposed parallel to each other. The transmission axis of the polarizer and a slow axis of the commercially available cellulose triacetate film were disposed orthogonal to each other.

(Preparation of Liquid Crystal Cell)

A liquid crystal cell was prepared by regulating a cell gap between substrates at 3.6 μm and pouring dropwise a liquid crystal material with negative dielectric anisotropy ("MLC6608", manufactured by Merck), followed by sealing to form a liquid crystal layer between the substrates. A retardation of the liquid crystal layer (namely, the product Δn·d of a thickness d (μm) of the liquid crystal layer and a refractive index anisotropy (Δn)) was regulated at 300 nm. The liquid crystal material was aligned so as to be vertically aligned.

(Mounting on VA Panel)

The polarizing plate was placed to be provided with the commercially available cellulose triacetate film (FUJI TAC TD80UF, manufactured by Fujifilm Corporation) inserted on both sides of the polarizer on an upper side polarizing plate, with the transmission axis of the polarizer disposed perpendicular to the slow axis of the commercially available cellulose triacetate film, and with the polarizing plate 307 on a lower side polarizing plate (backlight side) of a liquid crystal display device using the above-described vertical alignment type liquid crystal cell such that the cellulose acylate film of Example 107 faced the liquid crystal cell side. The upper side polarizing plate and the lower side polarizing plate were adhered onto the liquid crystal cell using an adhesive. The upper side polarizing plate and the lower side polarizing plate were disposed under a crossed Nicols such that the transmission axis of the upper side polarizing plate was disposed in a vertical direction, whereas the transmission axis of the lower side polarizing plate was disposed in a horizontal direction.

A rectangular wave voltage of 55 Hz was applied to the liquid crystal cell. A normally black mode with a white display of 5 V and a black display of 0 V was employed. A transmittance (%) of black display in a viewing angle in a direction at an azimuth angle of black display of 45° and a polar angle of 60° and a color deviation between a spot at an azimuth angle of 45° and a polar angle 60° and a spot at an azimuth angle of 180° and a polar angle of 60° were determined.

Also, a transmittance ratio (white display/black display) was taken as a contrast ratio using a measuring device (EZ-Contrast 160D, manufactured by ELDIM Corporation), and a viewing angle (a polar angle range where no grayscale inversion took place on the black side at a contrast ratio of equal to or more than 10) was measured on eight grades of from black display (L1) to white display (L8).

As a result of the observation of the prepared liquid crystal display device, a liquid crystal panel using the film of the present invention could realize neutral black display in any of the front direction and the viewing angle direction.

Further, the viewing angle (a polar angle range where no grayscale inversion took place on the black side at a contrast ratio of 10 or more) was equal to or more than 80° in the vertical and horizontal directions, and the color deviation at the time of black display was less than 0.02. Thus, good results were obtained.

(Example of Method for Preparation of Dope having Plural Solutions Mixed Therein)

(Cellulose Acylate Solution)

The following composition was charged into a mixing tank and stirred under heating, to dissolve the respective components, thereby preparing a cellulose acetate solution.

TABLE 30

| Cellulose acylate C-1 | 100 parts by mass |
| Polycondensate P-3 | 9.0 parts by mass |
| Bluing dye having the structure below B | 0.000078 parts by mass |
| Dichloromethane | 404.3 parts by mass |
| Methanol | 60.4 parts by mass |

(Matting Agent Dispersion)

The following composition containing the cellulose acylate solution prepared by the above-described method was charged into a dispersing machine to prepare a matting agent dispersion.

TABLE 31

| | |
|---|---|
| Silica particle having average particle diameter of 16 nm (AEROSIL R972 manufactured by Nippon Aerosil Co., Ltd.) | 2.0 parts by mass |
| Dichloromethane | 72.2 parts by mass |
| Methanol | 10.8 parts by mass |
| Cellulose acylate solution | 10.5 parts by mass |

(Optical Developing Agent A Solution)

The following composition containing the cellulose acylate solution prepared by the above-described method was charged into a mixing tank and stirred under heating to dissolve the respective components, thereby preparing an optical developing agent A solution.

TABLE 32

| | |
|---|---|
| Optical developing agent above A | 20.0 parts by mass |
| Dichloromethane | 58.2 parts by mass |
| Methanol | 8.7 parts by mass |
| Cellulose acylate solution | 13.2 parts by mass |

(Dope for Outer Layer)

The cellulose acylate solution, the matting agent dispersion, and the optical developing agent A solution were mixed to a composition of 9.0 parts by mass of the polycondensate P-3, 5.3 parts by mass of the above-described optical developing agent A, 0.14 part by mass of silica particle having an average particle diameter of 16 nm (AEROSIL R972, manufactured by Nippon Aerosil Co., Ltd), and 0.000078 part by mass of the above-described bluing dye B, based on 100 parts by mass of the above-described cellulose acylate C-1, thereby giving a dope 111 for an outer layer of co-casting. The addition amount of the respective additives to the cellulose acylate C-1 in this dope were the same as for the dope for an outer layer of Example 107 (the above-described dope 14).

(Dope for Inner Layer)

The cellulose acylate solution and the optical developing agent A solution were mixed to a composition of 9.0 parts by mass of polycondensate P-3, 5.3 parts by mass of the above-described optical developing agent A, and 0.000078 part by mass of the above-described bluing dye B, based on 100 parts by mass of the above-described cellulose acylate C-1, thereby giving a dope 111 for an inner layer of co-casting. The addition amount of the respective additives to the cellulose acylate C-1 in this dope were the same as for the dope for an inner layer of Example 107 (the above-described dope 15).

A cellulose acylate film was prepared in the same method as in Example 107, using the dope 111 for an outer layer and the dope 111 for an inner layer, wherein the cellulose acylate film of Example 111 having a film thickness of 82 μm and a film thickness ratio of the respective layers, the outer layer facing the support surface:the inner layer:the outer layer facing the air intersurface=3:94:3 was obtained.

For the cellulose acylate film of Example 111, the characteristics of the film were evaluated in the same manner as in Examples 101 to 110 and Comparative Examples 55 and 56, and it was found that the cellulose acylate film of Example 111 developed the performance equivalent to those of Example 107 having only difference in the method for preparing a dope.

In addition, a polarizing plate 311 was prepared using the cellulose acylate film of Example 111 in the same method as in Example 307, and a mounting experiment on a liquid crystal displace device of a VA mode was carried out. The display performance was equivalent to that of Example 307 using the cellulose acylate film of Example 107, and showed good results.

From the above, it can be seen that the dope using the cellulose ester film of the present invention can be prepared by preparing the solutions of additives in advance, and then mixing the respective solutions, and a cellulose ester film having good performance from dope prepared thus can be obtained.

(Example of Effect of Heating Temperature Upon Dissolution of Dope)

The dopes formulated in the same manner as for the dopes of the inner layers and outer layers of Example 110 were stirred and heated, respectively, to 85° C., 90° C., 95° C., and 115° C., to dissolve the respective components for the preparation. A cellulose acylate film was prepared using this dope in the same method as in Example 110, wherein a cellulose acylate film having a film thickness of 82 μm and a film thickness ratio of the respective layers, the outer layer facing the support surface:the inner layer:the outer layer facing the air intersurface=3:94:3 was obtained. The films having the temperatures for heating and dissolving the dope were 85° C., 90° C., 95° C., and 115° C., respectively, were taken as those of Examples 112 to 115.

For the cellulose acylate films of Examples 112 to 115, the bleed-out, the haze, and the internal haze were measured by the above-described method and shown in Table 33.

TABLE 33

| Example | Temperature of dope heating solution | Bleed-out | Haze | Internal haze |
|---|---|---|---|---|
| 112 | 85 | ◎ | 0.39 | 0.07 |
| 113 | 90 | ◎ | 0.32 | 0.03 |
| 114 | 95 | ◎ | 0.33 | 0.03 |
| 115 | 115 | ◎ | 0.31 | 0.03 |

In the comparison of Examples 112 to 115, for the haze and the internal haze, in Example 113 in which the dope heating temperature was 90° C., Example 114 in which the dope heating temperature was 95° C., and Example 115 in which the dope heating temperature was 115° C., the haze and the internal haze were lowered, as compared with Example 112 in which the dope heating temperature was 85° C. By setting the dope heating temperature at a high temperature, the compatibility among the polycondensate of the present invention, other additives, and cellulose acylate is improved, and thus phase separation is hardly generated, and by setting the temperature particularly at 90° C. or higher, it is possible to prepare a film having sufficiently low hazes and internal hazes. That is, the cellulose ester film of the present invention can allow the haze and the internal haze to be further lowered by optimizing the dope heating and dissolving temperature.

Examples 312 to 315

Preparation of Polarizing Plate and Mounting Experiment on Liquid Crystal Displace Device of VA Mode The polarizing plates 312 to 315 were prepared with the films of Example 112 to 115 in the same method as in Example 307, and a mounting experiment on a VA panel was carried out.

For this panel, a luminance value of white display and black display in the direction of the tangential line to the panel was measured in a dark room, using a measuring device (BMSA, manufactured by TOPCON Inc.), and thus, a front contrast (white luminance/black luminance) was calculated. At this time, the distance between the measuring device and the panel was set to 700 mm.

The front contrasts of Examples 313 to 315 were higher by 3% than that of Example 312, and by setting the dope heating and dissolving temperature to a high temperature of 90° C. or higher, better results could be obtained.

What is claimed is:

1. A cellulose ester film comprising a polycondensate obtained from a diol and a dicarboxylic acid, the polycondensate containing the following (1) and (2):
   (1) a dicarboxylic acid residue containing an aromatic dicarboxylic acid residue and an aliphatic dicarboxylic acid residue having an average carbon number of 4.0 to 5.0, wherein a ratio of the aromatic dicarboxylic acid residue represented by the following equation is from 40% by mole to 95% by mole:

The ratio of the aromatic dicarboxylic acid residue=[(the number of moles of the aromatic dicarboxylic acid residue)/((the number of moles of the aromatic dicarboxylic acid residue)+(the number of moles of the aliphatic dicarboxylic acid residues))]×100; and (2) an aliphatic diol residue having an average carbon number of 2.0 to 3.0.

2. The cellulose ester film as described in claim 1, wherein the aromatic dicarboxylic acid residue comprises a terephthalic acid residue.

3. The cellulose ester film as described in claim 1, wherein the polycondensate is a polyester polyol.

4. The cellulose ester film as described in claim 1, wherein a terminal of the polycondensate is an aliphatic monocarboxylic acid residue.

5. The cellulose ester film as described in claim 1, wherein a number average molecular weight of the polycondensate is equal to or more than 800 and equal to or less than 2500.

6. The cellulose ester film as described in claim 1, wherein the cellulose ester film comprises a cellulose acylate, and a substitution degree of an acyl group of the cellulose acylate film is from 2.10 to 2.95.

7. The cellulose ester film as described in claim 1, wherein the cellulose ester film is obtained by stretching, and a stretch ratio is from 1% to 100% in a direction vertical to a conveyance direction of the cellulose film (a width direction of the cellulose ester film).

8. An optically compensatory film comprising a cellulose ester film as described in claim 1.

9. A polarizing plate comprising: a polarizer and protective films adhered on respective sides of the polarizer, wherein at least one of the protective films is an optically compensatory film as described in claim 8.

10. A liquid crystal display device comprising a polarizing plate as described in claim 9.

* * * * *